US012726992B2

(12) United States Patent
Li et al.

(10) Patent No.: US 12,726,992 B2
(45) Date of Patent: Sep. 1, 2026

(54) CONTROL INFORMATION DCI TRANSMISSION METHOD AND RELATED DEVICE

(71) Applicant: VIVO MOBILE COMMUNICATION CO., LTD., Dongguan (CN)

(72) Inventors: Na Li, Dongguan (CN); Siqi Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 898 days.

(21) Appl. No.: 17/989,421

(22) Filed: Nov. 17, 2022

(65) Prior Publication Data

US 2023/0085345 A1 Mar. 16, 2023

Related U.S. Application Data

(63) Continuation of application No. PCT/CN2021/096262, filed on May 27, 2021.

(30) Foreign Application Priority Data

May 29, 2020 (CN) ......................... 202010478407.0

(51) Int. Cl.
*H04W 72/23* (2023.01)
*H04L 5/00* (2006.01)
*H04W 72/1273* (2023.01)

(52) U.S. Cl.
CPC ........... *H04W 72/23* (2023.01); *H04L 5/0053* (2013.01); *H04L 5/0094* (2013.01); *H04W 72/1273* (2013.01)

(58) Field of Classification Search
CPC ............. H04W 72/23; H04W 72/1273; H04W 72/0446; H04W 72/046; H04W 72/1263;
(Continued)

(56) References Cited

U.S. PATENT DOCUMENTS

2013/0088973 A1 4/2013 Yang et al.
2019/0223164 A1 7/2019 He et al.
(Continued)

FOREIGN PATENT DOCUMENTS

CN 102368871 A 3/2012
CN 110324127 A 10/2019
(Continued)

OTHER PUBLICATIONS

China National Intellectual Property Administration, International Search Report issued in corresponding Application No. PCT/CN2021/096262, mailed Aug. 12, 2021.
(Continued)

*Primary Examiner* — Oussama Roudani
(74) *Attorney, Agent, or Firm* — Foley & Lardner LLP

(57) ABSTRACT

A DCI transmission method is provided, which includes: transmitting configuration information that is used for allocating N search space sets; dropping part or all of PDCCH candidates of at least one search space in a first search space set in a case that the number of PDCCH candidates in the first search space set is greater than a maximum number of PDCCH candidates supported by a terminal, to obtain a second search space set; and transmitting DCI on the second search space set; where the first search space set includes a first search space, the first search space is a search space for scheduling a second cell by a first cell, the first cell is a secondary cell, and the number of PDCCH candidates in the second search space set is less than or equal to the maximum number of PDCCH candidates supported by the terminal.

17 Claims, 13 Drawing Sheets

(58) Field of Classification Search
CPC .. H04W 72/56; H04W 72/232; H04L 5/0053; H04L 5/0094; H04L 5/0035; H04L 5/0096; H04L 5/0032
See application file for complete search history.

(56) References Cited

U.S. PATENT DOCUMENTS

| | | | | |
|---|---|---|---|---|
| 2019/0260524 | A1* | 8/2019 | Nam | H04L 5/0005 |
| 2021/0058189 | A1 | 2/2021 | Xiao et al. | |
| 2021/0144746 | A1 | 5/2021 | Ji | |
| 2021/0168774 | A1* | 6/2021 | Li | H04W 16/14 |
| 2022/0158754 | A1* | 5/2022 | Papasakellariou | H04W 72/23 |
| 2024/0237013 | A1* | 7/2024 | Pan | H04W 72/20 |

FOREIGN PATENT DOCUMENTS

| | | | |
|---|---|---|---|
| CN | 110351841 | A | 10/2019 |
| CN | 110474737 | A | 11/2019 |
| CN | 110662228 | A | 1/2020 |
| CN | 110740479 | A | 1/2020 |
| WO | 2020015643 | A1 | 1/2020 |
| WO | 2020197215 | A1 | 10/2020 |

OTHER PUBLICATIONS

Braun, V., et al. 5G NR Physical Downlink Control Channel: Design, Performance and Enhancements. 2019 IEEE Wireless Communications and Networking Conference (WCNC).

LTE-A. Research and Realization of Physical Downlink Control Channel in LTE-A System. Jun. 8, 2016.

3GPP TSG RAN1#51. Jeju, Korea. Nov. 5-9, 2007. R1-074583. Motorola. Search Space Definition: Reduced PDCCH Blind Detection for Split PDCCH Search Space.

3GPP TSG RAN1#51bis. Sevilla, Spain. Jan. 14-18, 2008. R1-080079. Motorola. Search Space Definition: Reduced PDCCH Blind Detection for Split PDCCH Search Space.

Nabil, F., et al. Scattered Search Space Scheme for PDCCH and ePDCCH in LTE-Advanced. 2015 7th International Congress on Ultra Modern Telecommunications and Control Systems and Workshops.

Design and Implementation of Physical Downlink Control Channel Fast Blind Detection. (translation not available).

Extended European Search Report for Application No. 21814144.8, dated Oct. 24, 2023, 11 Pages.

Intel Corporation "Remaining issues on PDCCH enhancements for URLLC" 3GPP TSG RAN WG1 #100bis-E, e-Meeting, Apr. 2020, R1-2001998, 16 Pages.

Qualcomm "Remaining Issues on PDCCH Enhancements for URLLC" 3GPP TSG RAN WG1 #100b eMeeting, Apr. 2020, R1-2002544, 10 Pages.

First Office Action for Japanese Application No. 2022-565858, dated Nov. 17, 2023, 6 Pages.

Ericsson "New WID on NR Dynamic spectrum sharing (DSS)" 3GPP TSG RAN Meeting #86, Sitges, Spain, Dec. 2019, RP-193260, 4 Pages.

* cited by examiner

| Slot | 1 | 2 | 3 | 4 | 5 | 6 | 7 | 8 | 9 |
|---|---|---|---|---|---|---|---|---|---|
| Common search space | 24 | | | | 24 | | | | 24 |
| User-specific search space 1 | 20 | | 24 | | 20 | | 24 | | 20 |
| User-specific search space 2 | 10 | 18 | 20 | 24 | 15 | 24 | 20 | 24 | 17 |

Second time unit

Primary cell
30kHz

Y Y

Secondary cell
15kHz

First time unit

First-type CSS

Primary cell

Support

Secondary cell 1

Support

Secondary cell 2

Not support

CONTROL INFORMATION DCI TRANSMISSION METHOD AND RELATED DEVICE

CROSS-REFERENCE TO RELATED APPLICATIONS

This application is a continuation of International Application No. PCT/CN2021/096262, filed on May 27, 2021, which claims priority to Chinese Patent Application No. 202010478407.0, filed in China on May 29, 2020, which is incorporated herein by reference in its entirety.

TECHNICAL FIELD

This application relates to the field of communications technologies, and in particular, to a control information DCI transmission method and a related device.

BACKGROUND

In a new radio (NR) system, downlink control information (DCI) is carried on a physical downlink control channel (PDCCH). After a series of processes such as scrambling, modulation, and coding, the DCI is mapped to physical resources in unit of control channel elements (CCEs). For each piece of DCI, L=1, 2, 4, 8, or 16 CCEs may be allocated, where the number of CCEs of the DCI is expressed as an aggregation level (AL). DCI with AL=L is mapped to a control resource set (CORESET) configured by a network device. In addition, the network device may configure a search space (SS) set, and an SS includes the following two types:

1. a common search space (CSS) set jointly monitored by a group of UEs in a cell; and
2. a user-specific search space (USS) set monitored by a single terminal (User Equipment, UE).

In the SS set, PDCCH candidates that need to be monitored (monitoring) are further configured for the UE.

The UE performs blind decoding on PDCCH candidates carrying DCI, so as to demodulate control information for scheduling the UE. Monitoring a large number of PDCCH candidates or CCEs may increase complexity for the UE. In order to reduce implementation complexity for the UE, the NR system specifies a maximum number of blind detections and a maximum number of channel estimations for the UE in unit time, that is, a sum of the total number of blind detections and that of channel estimations in all search spaces cannot exceed the upper limits.

When more than one SS set is configured for the UE, the number of PDCCH candidates/CCEs varies with slots because a monitoring opportunity of each SS set is independently configured. Therefore, a base station (BS) is allowed to configure, for the UE, the number of PDCCH candidates/CCEs per slot or per first monitoring span of each slot to exceed a UE capability limit, which is also referred to as overbooking.

At present, the system supports only self-carrier scheduling on PCell, and usually configures to send a variety of CSS sets and USS sets on the primary cell (PCell), resulting in relatively large PDCCH overheads of the PCell.

SUMMARY

According to a first aspect of the present disclosure, a control information DCI transmission method is provided, applied to a terminal and including:

transmitting configuration information, where the configuration information is used for allocating N search space sets, and N is a positive integer;

dropping part or all of PDCCH candidates of at least one search space in a first search space set in a case that the number of PDCCH candidates in the first search space set is greater than a maximum number of PDCCH candidates supported by a terminal, so as to obtain a second search space set; and transmitting DCI on the second search space set; where the first search space set is any one of the N search space sets, at least one search space set in the N search space sets includes a first search space, the first search space is a search space for scheduling a second cell by a first cell, the first cell is a secondary cell SCell, and the number of PDCCH candidates in the second search space set is less than or equal to the maximum number of PDCCH candidates supported by the terminal.

According to a second aspect of the present disclosure, a control information DCI transmission apparatus is provided, including:

a receiving module, configured to transmit configuration information, where the configuration information is used for allocating N search space sets, and N is a positive integer;

a dropping module, configured to drop part or all of PDCCH candidates of at least one search space in a first search space set in a case that the number of PDCCH candidates in the first search space set is greater than a maximum number of PDCCH candidates supported by a terminal, so as to obtain a second search space set; and a detection module, configured to transmit DCI on the second search space set; where the first search space set is any one of the N search space sets, at least one search space set in the N search space sets includes a first search space, the first search space is a search space for scheduling a second cell by a first cell, the first cell is a secondary cell SCell, and the number of PDCCH candidates in the second search space set is less than or equal to the maximum number of PDCCH candidates supported by the terminal.

According to a third aspect of the present disclosure, a communications device is provided, where the communications device includes a processor, a memory, and a program or an instruction stored in the memory and capable of running on the processor, and when the program or the instruction is executed by the processor, the steps of the method according to the first aspect are implemented.

According to a fourth aspect of the present disclosure, a computer-readable storage medium is provided, where a program or an instruction is stored in the computer-readable storage medium, and when the program or the instruction is executed by a processor, the steps of the method according to the first aspect are implemented.

According to a fifth aspect of the present disclosure, a chip is provided, where the chip includes a processor and a communications interface, the communications interface is coupled to the processor, and the processor is configured to run a program or an instruction of a network device to implement the method according to the first aspect.

In the embodiments of this application, the configuration information is transmitted, where the configuration information is used for allocating N search space sets; part or all of the PDCCH candidates of the at least one search space in the first search space set are dropped in the case that the number of PDCCH candidates in the first search space set is greater than the maximum number of PDCCH candidates supported by the terminal, so as to obtain the second search space set; and then the DCI is transmitted on the second search space set. The first search space set is any one of the N search space sets, at least one search space set in the N search space sets includes the first search space, the first search space is a search space for scheduling the second cell by the first cell, the first cell is a secondary cell, and the number of PDCCH candidates in the second search space set is less than or equal to the maximum number of PDCCH candidates supported by the terminal.

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the numbers used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

It should be noted that technologies described in the embodiments of this application are not limited to a long term evolution (LTE)/LTE-advanced (LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application may be usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the sixth generation (6G) communications system.

Figures 1, 2:
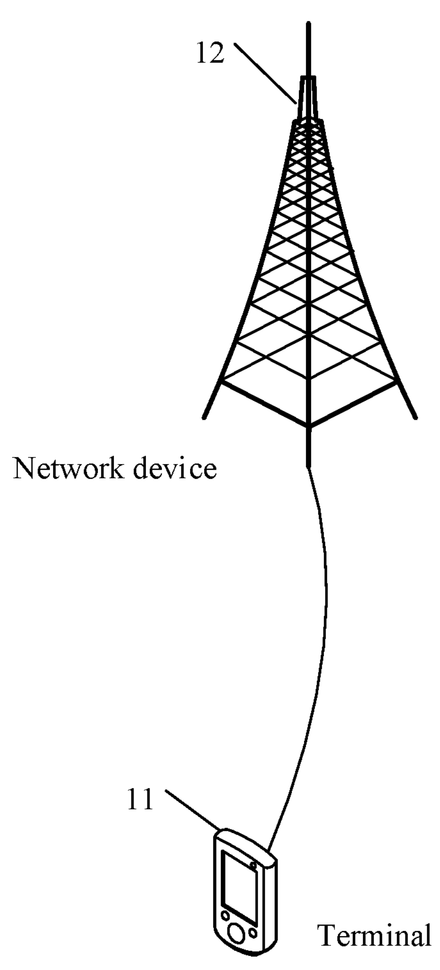
FIG. 1 is a structural diagram of a network system to which the embodiments of this application are applicable.
FIG. 2 is a schematic diagram of a PDCCH candidate mapping rule.

FIG. 1 is a block diagram of a wireless communications system to which the embodiments of this application are applicable. The wireless communications system includes a terminal 11 and a network device 12. The terminal 11 may also be referred to as a terminal device or user equipment (UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or an in-vehicle device (VUE), or a pedestrian terminal (PUE). The wearable device includes: a bracelet, earphones, glasses, or the like. It should be noted that a specific type of the terminal 11 is not limited in the embodiments of this application. The network device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example and a specific type of the base station is not limited.

For ease of understanding, the following describes some content included in the embodiments of this application.

When more than one SS set is configured for the UE, the number of PDCCH candidates/CCEs varies with slots because a monitoring opportunity of each SS set is independently configured. Therefore, a network device is allowed to configure, for the UE, the number of PDCCH candidates/CCEs per slot (slot) or per first monitoring span (span) of each slot to exceed a UE capability limit, which is also referred to as overbooking in the embodiments of this application. Based on this configuration, for each slot or the first span of each slot, the UE and the network device map PDCCH candidates to each slot according to the following mapping rules/sequences:

1. First perform mapping to a CSS set and then mapping to a USS set.
2. Perform mapping to a USS set in ascending order of SS index values (SS set ID), where if the number of all PDCCH candidates/CCEs after another USS set is added exceeds a UE processing capability, the UE drops the entire USS set.

As shown in FIG. 2, mapping CCEs to a CSS, a USS #1, and a USS #2 is used as an example.

Monitoring times of the CSS, the USS #1, and the USS #2 are configured as follows: In slots 1, 5, and 9, after mapping to the CSS and the USS #1, mapping to the USS #2 cannot be further performed; in other words, a user capability is exceeded and therefore mapping to the USS #2 cannot be further performed.

Optionally, in a unit of slot, for cases with subcarrier spacings (SCS) being 15 kHz, 30 kHz, 60 kHz, and 120 kHz, the following tables list a sum of the total number of blind detections of PDCCH candidates in all search spaces and a maximum number of non-overlapping CCEs for channel estimation that are defined.

For a single serving cell, on a downlink bandwidth part (DL BWP) with an SCS configuration of μ∈{0, 1, 2, 3}, a maximum number $$M_{PDCCH}^{max,slot,\mu}$$

of monitored PDCCH candidates per slot is as follows:

| μ | $M_{PDCCH}^{max,slot,\mu}$ |
|---|---|
| 0 | 44 |
| 1 | 36 |
| 2 | 22 |
| 3 | 20 |

For a single serving cell, on a DL BWP with an SCS configuration of μ∈{0, 1, 2, 3}, a maximum number $$M_{PDCCH}^{max,slot,\mu}$$

of non-overlapping CCEs per slot is as follows:

| μ | $M_{PDCCH}^{max,slot,\mu}$ |
|---|---|
| 0 | 56 |
| 1 | 56 |
| 2 | 48 |
| 3 | 32 |

For supporting ultra-reliable and low latency communication (URLLC) services, a time granularity of PDCCH monitoring is changed from slot to span with a combination of (x,y), where x is a minimum time interval (the number of symbols) between start symbols of two spans, y is a maximum time the span can last.

Optionally, in a unit of span, for SCS=15 kHz or 30 kHz, a sum of the total number of blind detections of PDCCH candidates in all search spaces and a maximum number of non-overlapping CCEs for channel estimation are shown in the following tables.

For a single serving cell, on a DL BWP with an SCS configuration of μ∈{0, 1}, a maximum number $$M_{PDCCH}^{max,slot,\mu}$$

of monitored PDCCH candidates in a span of combination (x,y) is as follows:

| | $M_{PDCCH}^{max,(X,Y),\mu}$ | | |
|---|---|---|---|
| μ | (2, 2) | (4, 3) | (7, 3) |
| 0 | M01 | M02 | M03 |
| 1 | M11 | M12 | M13 |

For a single serving cell, on a DL BWP with an SCS configuration of μ∈{0, 1}, a maximum number $$M_{PDCCH}^{max,slot,\mu}$$

of non-overlapping CCEs in a span of combination (x,y) is as follows:

| | $M_{PDCCH}^{max,(X,Y),\mu}$ | | |
|---|---|---|---|
| μ | (2, 2) | (4, 3) | (7, 3) |
| 0 | C01 | C02 | 56 |
| 1 | C11 | C12 | 56 |

A variety of CSS sets and USS sets are supported on the PCell, and therefore when a plurality of different search spaces overlap in time, overbooking is allowed only on the PCell for assignment of the number of blind detections or channel estimations. For a secondary cell (SCell) with SS sets to be less monitored, the network side ensures that a maximum number of blind detections of PDCCH candidates and that of non-overlapping CCEs do not exceed a maximum number of blind detections and a maximum number of channel estimates that are supported by the UE respectively.

Based on consideration of enhancing coverage of a control channel, the PCell is generally deployed on a low-band carrier (carrier). In addition, low-band carriers have insufficient bandwidth and have also been deployed in large scale for other series, such as long term evolution (LTE). In this case, a high-band carrier may be configured for an SCell and the SCell schedules the PCell to resolve the problem of a limited control channel capacity of the PCell and reduce control channel PDCCH overheads. In view of this, the solution of this application is proposed.

The following describes in detail a DCI transmission method provided in the embodiments of this application by using specific embodiments and application scenarios thereof with reference to the accompanying drawings.

Figures 3, 4A:
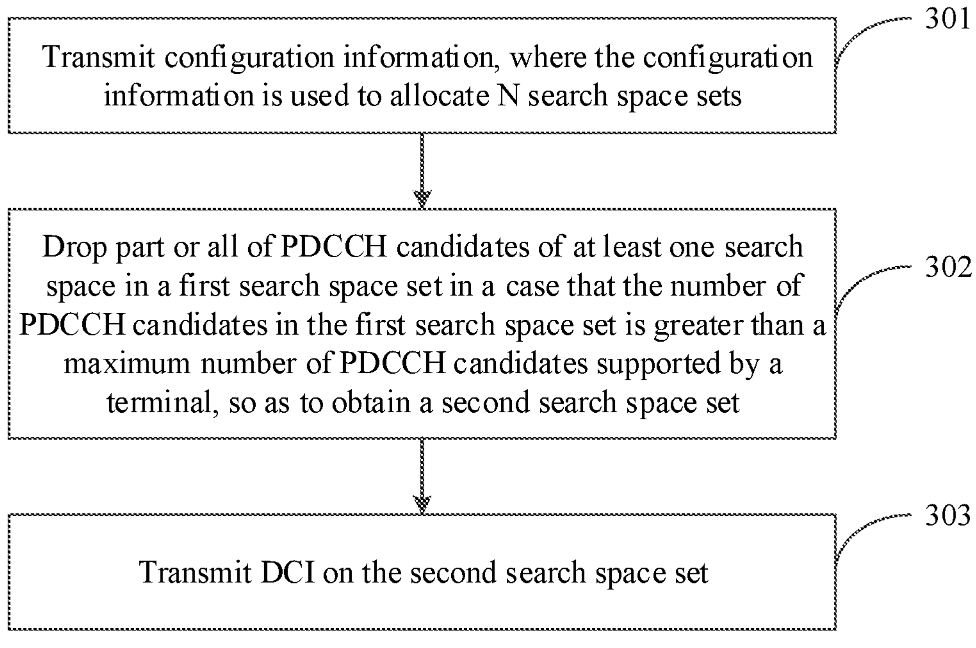
FIG. 3 is a flowchart of a DCI transmission method according to an embodiment of this application.
FIG. 4*a* is a first example diagram of a maximum number of cross-carrier PDCCH candidates corresponding to scheduling of a PCell by a first cell in a DCI transmission method according to an embodiment of this application.

Referring to FIG. 3, FIG. 3 is a flowchart of a DCI transmission method according to an embodiment of this application. The method is applied to a terminal or a network device. As shown in FIG. 3, the method includes the following steps.

Step 301: Transmit configuration information, where the configuration information is used for allocating N search space sets, and N is a positive integer.

Step 302: Drop part or all of PDCCH candidates of at least one search space in a first search space set in a case that the number of PDCCH candidates in the first search space set is greater than a maximum number of PDCCH candidates supported by a terminal, so as to obtain a second search space set.

Step 303: Transmit DCI on the second search space set.

The first search space set is any one of the N search space sets, at least one search space set in the N search space sets includes a first search space, the first search space is a search space for scheduling a second cell by a first cell, the first cell is a secondary cell SCell, and the number of PDCCH candidates in the second search space set is less than or equal to the maximum number of PDCCH candidates supported by the terminal.

In this embodiment, the N search space sets may be understood as search space sets corresponding to N cells, where a search space set in each cell includes at least one search space. The search spaces may be classified into a plurality of types by a scheduling manner, and for example, may include the first search space, or may include other search spaces, such as a search space for scheduling the PCell by the SCell, a search space for self-scheduling of the PCell, a search space for self-scheduling of the SCell, and a search space for scheduling other SCells by the SCell. The search space for scheduling the PCell by the SCell may be referred to as SP-CR-SS, the search space for self-scheduling of the PCell may be referred to as P-Self-SS, the search space for self-scheduling of the SCell may be referred to as O-self-SS, and the search space for scheduling other SCells by the SCell may be referred to as O-otherS-SS. It should be understood that each search space set may include at least one search space described above, and types of search spaces included in different search space sets may be the same or different, which are not further limited herein.

The second cell may be an SCell or a PCell, the number of first cells may be one or more, and there may be one or more first cells for scheduling the PCell. The first search space may include an SP-CR-SS and an O-otherS-SS.

In this embodiment of this application, the number of PDCCH candidates in the first search space set being greater than the maximum number of PDCCH candidates supported by the terminal may be construed as a cell of the first search space set being configured to support overbooking. Alternatively, search space sets of one or more cells may be configured as the first search space set, in other words, one or more cells may be configured to support overbooking. For example, in an embodiment, in a case that one cell is configured to support overbooking, the PCell may be configured to support overbooking, or the first cell may be configured to support overbooking. In a case that at least two cells are configured to support overbooking, cells that support overbooking may include the PCell or may not include the PCell, which is not further limited herein.

The number of PDCCH candidates may be understood as the number of blind detections or the number of CCEs. The transmitting DCI may be understood as receiving the DCI or sending the DCI, alternatively, the network device sends the DCI in the second search space set, and the terminal receives the DCI in the second search space set. In this embodiment of this application, the terminal may also be referred to as a user. Receiving the DCI may be understood as performing blind detection on the DCI, for example, blind decoding may be performed on the PDCCH candidates in the second search space set to demodulate scheduling control information.

In this embodiment of this application, the configuration information is transmitted, where the configuration information is used for allocating N search space sets; part or all of the PDCCH candidates of the at least one search space in the first search space set are dropped in the case that the number of PDCCH candidates in the first search space set is greater than the maximum number of PDCCH candidates supported by the terminal, so as to obtain the second search space set; and then the DCI is transmitted on the second search space set. The first search space set is any one of the N search space sets, at least one search space set in the N search space sets includes the first search space, the first search space is a search space for scheduling the second cell by the first cell, the first cell is a secondary cell, and the number of PDCCH candidates in the second search space set is less than or equal to the maximum number of PDCCH candidates supported by the terminal. In this way, cross-carrier scheduling is implemented on the SCell, so as to resolve a problem of a limited control channel capacity of the PCell and reduce PDCCH overheads of the PCell.

Optionally, the configuration information is further used for allocating a corresponding quantity of PDCCH candidates for each of the search space sets.

Optionally, the maximum number of PDCCH candidates supported by the terminal includes at least one of the following:

- a maximum number X of PDCCH candidates corresponding to self-scheduling of a primary cell PCell;
- a maximum number Y of cross-carrier PDCCH candidates corresponding to scheduling of the PCell by the first cell;
- a maximum number P of PDCCH candidates supported by the PCell;
- a maximum number S of PDCCH candidates supported by the first cell;
- a maximum number F of PDCCH candidates corresponding to self-scheduling of the first cell; or a maximum number O of PDCCH candidates corresponding to scheduling of SCells other than the first cell by the first cell.

X may be understood as the maximum number of PDCCH candidates for self-scheduling of the PCell in each time unit. In the embodiments of this application, the time unit may be understood as a slot or a span.

Optionally, Y Includes any One of the Following:

a maximum number of PDCCH candidates using a first time unit in the first cell; and a maximum number of PDCCH candidates using a second time unit in the first cell; where the first time unit is a time unit for a subcarrier spacing SCS of the first cell, and the second time unit is a time unit for an SCS of the PCell.

Figures 4B, 5A, 5B:
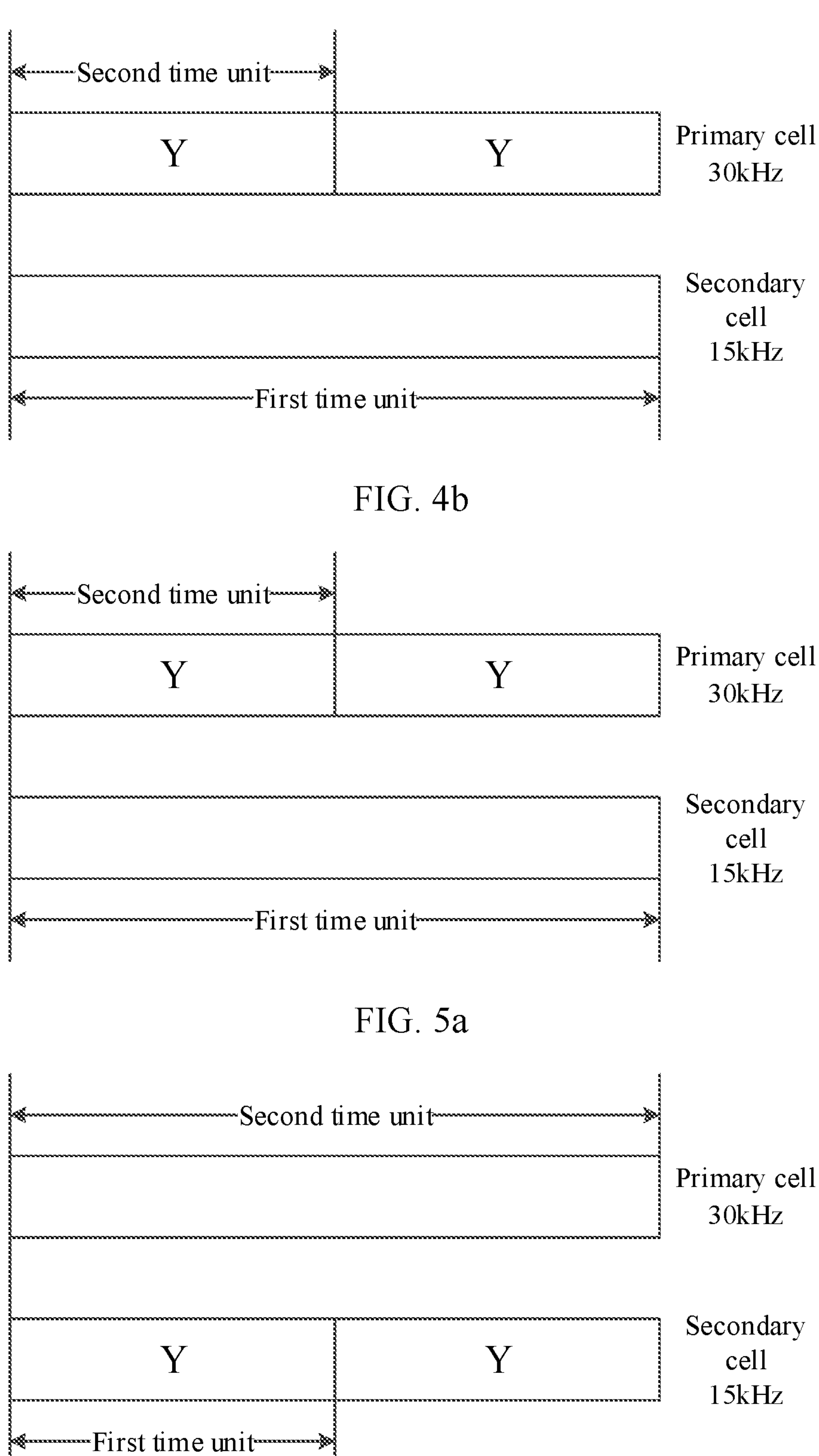
FIG. 4*b* is a second example diagram of a maximum number of cross-carrier PDCCH candidates corresponding to scheduling of a PCell by a first cell in a DCI transmission method according to an embodiment of this application.
FIG. 5*a* is a third example diagram of a maximum number of cross-carrier PDCCH candidates corresponding to scheduling of a PCell by a first cell in a DCI transmission method according to an embodiment of this application.
FIG. 5*b* is a fourth example diagram of a maximum number of cross-carrier PDCCH candidates corresponding to scheduling of a PCell by a first cell in a DCI transmission method according to an embodiment of this application.

In the case of the maximum number of PDCCH candidates using the first time unit in the first cell, if PCell SCS=15 kHz and SCell SCS=30 kHz, for one second time unit of the PCell, the maximum number of PDCCH candidates for cross-carrier scheduling is Y+Y, as shown in FIG. 4*a*; or if PCell SCS=30 kHz and SCell SCS=15 kHz, for two second time units of the PCell, the maximum number of PDCCH candidates for cross-carrier scheduling is Y, as shown in FIG. 4*b*.

In the case of the maximum number of PDCCH candidates using the second time unit in the first cell, if PCell SCS=15 kHz and SCell SCS=30 kHz, for one second time unit of the PCell, the maximum number of PDCCH candidates for cross-carrier scheduling is Y, as shown in FIG. 5*b*; or if PCell SCS=30 kHz and SCell SCS=15 kHz, for one second time unit of the PCell, the maximum number of PDCCH candidates for cross-carrier scheduling is Y, as shown in FIG. 5*a*.

Optionally, P Satisfies at Least One of the Following:

in a case that the number of PDCCH candidates of a third search space belongs to the number of PDCCH candidates of the PCell and Y is the maximum number of PDCCH candidates using the first time unit in the first cell, $P=X+(2^{\mu})*Y$, where $$\mu = \frac{\mu_2}{\mu_1},$$

$\mu_1$ is the SCS of the PCell, and $\mu_2$ is the SCS of the first cell;

in a case that the number of PDCCH candidates of the third search space belongs to the number of PDCCH candidates of the PCell and Y is the maximum number of PDCCH candidates using the second time unit in the first cell, P=X+Y; or in a case that the number of PDCCH candidates of the third search space belongs to the number of PDCCH candidates of the first cell, P=X; where the third search space is a search space for scheduling the PCell by the SCell.

In this embodiment, using blind detection as an example, the number of PDCCH candidates of the third search space belonging to the PDCCH candidates of the PCell may be understood as the SP-CR-SS being counted in the blind detections of the PCell. The number of PDCCH candidates of the first search space belonging to the number of PDCCH candidates of the first cell may be understood as the SP-CR-SS being counted in the blind detections of the first cell.

It should be noted that, in this embodiment of this application, it is necessary to ensure that the number of PDCCH candidates executed by the terminal does not exceed the maximum number of PDCCH candidates supported by the terminal. Optionally, the number of PDCCH candidates of the second search space set being less than or equal to the maximum number of PDCCH candidates supported by the terminal includes at least one of the following:

the number of PDCCH candidates of a second search space in each second time unit is less than or equal to X, and the second search space is a search space for self-scheduling of the PCell;

in a case that the number of PDCCH candidates of a third search space belongs to the number of PDCCH candidates of the PCell, the number of PDCCH candidates of the third search space in each second time unit is less than or equal to a first value; or in a case that the number of PDCCH candidates of the third search space belongs to the number of PDCCH candidates of the first cell, the number of PDCCH candidates of the third search space in each first time unit is less than or equal to a second value; where the first time unit is a time unit for an SCS of the first cell, the second time unit is a time unit for an SCS of the PCell, and the third search space is a search space for scheduling the PCell by the SCell.

In this embodiment, when a different time unit is used in the first cell, the first value and the second value are both different. For example, in an embodiment, the first value satisfies at least one of the following:

in a case that Y is the maximum number of PDCCH candidates using the first time unit in the first cell, the first value is $(2^{\mu})*Y$, where $$\mu = \frac{\mu_2}{\mu_1},$$

$\mu_1$ is the SCS of the PCell, and $\mu_2$ is the SCS of the first cell; or in a case that Y is the maximum number of PDCCH candidates using the first time unit in the PCell, the first value is Y.

In another embodiment, the second value satisfies at least one of the following:

in a case that Y is the maximum number of PDCCH candidates using the first time unit in the first cell, the second value is Y; or in a case that Y is the maximum number of PDCCH candidates using the second time unit in the PCell, the second value is $$\left(2^{\frac{1}{\mu}}\right)*Y,$$

where $$\mu = \frac{\mu_2}{\mu_1},$$

$\mu_1$ is the SCS of the PCell, and $\mu_2$ is the SCS of the first cell.

In other words, in this embodiment, when the SP-CR-SS is counted in the blind detections of the PCell, the SCS of the PCell being used for slot or span includes the following cases:

if Y is the maximum number of PDCCH candidates per slot or per span using the SCS of the scheduling SCell in the scheduling (scheduling) SCell, the SP-CR-SS does not exceed (2μ)*Y; and if Y is the maximum number of PDCCH candidates per slot or per span using the SCS of the PCell in the PCell, the SP-CR-SS does not exceed Y.

When the SP-CR-SS is counted in the blind detections of the scheduling SCell, the SCS of the SCell being used for slot or span includes the following cases:

if Y is the maximum number of PDCCH candidates per slot or per span using the SCS of the scheduling SCell in the scheduling SCell, the SP-CR-SS does not exceed Y; and if Y is the maximum number of PDCCH candidates per slot or per span using the SCS of the PCell in the PCell, the SP-CR-SS does not exceed $$\left(2^{\frac{1}{\mu}}\right)*Y.$$

Optionally, in an embodiment, in a case that the PCell supports overbooking of the number of PDCCH candidates, the second search space set corresponding to the PCell satisfies at least one of the following:

in a case that Y is the maximum number of PDCCH candidates using a first time unit in the first cell, a sum of the number of PDCCH candidates in a second search space and the number of PDCCH candidates in a third search space is less than or equal to $X+(2^{\mu})*Y$;

in a case that Y is the maximum number of PDCCH candidates using a second time unit in the PCell, a sum of the number of PDCCH candidates in the third search space and the number of PDCCH candidates in the second search space is less than or equal to X+Y; or a sum of the number of PDCCH candidates in the first search space and the number of PDCCH candidates in the second search space is less than or equal to P; where $$\mu=\frac{\mu_2}{\mu_1},$$

$\mu_1$ is an SCS of the PCell, $\mu_2$ is an SCS of the first cell, the first time unit is a time unit for an SCS of the first cell, the second time unit is a time unit for an SCS of the PCell, the second search space is a search space for self-scheduling of the PCell, and the third search space is a search space for scheduling the PCell by the SCell.

In this embodiment, the blind detections of the SP-CR-SS being counted as part of the blind detection budget (budget) of the PCell may be understood as blind detection resources being divided based on the scheduled cell, featuring a simple division manner. In addition, overbooking may be implemented for the PCell subsequently, which reduces a user blocking rate during scheduling of the PCell.

Optionally, in another embodiment, in a case that the first cell supports overbooking of the number of PDCCH candidates, the second search space set corresponding to the first cell satisfies at least one of the following:

the number of PDCCH candidates in a second search space is less than or equal to P; or in a case that the number of PDCCH candidates of a third search space belongs to the number of PDCCH candidates of the first cell, the number of PDCCH candidates of the third search space is less than or equal to Y, and a preset condition is satisfied; where the second search space is a search space for self-scheduling of the PCell, and the third search space is a search space for scheduling the PCell by the SCell.

In this embodiment, the blind detections of the SP-CR-SS being counted as part of the blind detection budget of the scheduling SCell may be understood as blind detection resources being divided based on the scheduling cell, featuring a flexible division manner. In addition, overbooking may be implemented for the SCell subsequently, which reduces a user blocking rate during scheduling of the scheduling SCell.

Optionally, the Preset Condition Includes at Least One of the Following:

in a case that Y is the maximum number of PDCCH candidates using a first time unit in the first cell, $Y+F+O\leqslant S$; or in a case that Y is the maximum number of PDCCH candidates using a second time unit in the PCell, $$\left(2^{\frac{1}{\mu}}\right)*Y+F+O\leqslant S;$$

where the first time unit is a time unit for an SCS of the first cell, and the second time unit is a time unit for an SCS of the PCell.

It should be noted that the dropping part or all of physical downlink control channel PDCCH candidates of at least one search space in a first search space set in a case that the number of PDCCH candidates in the first search space set is greater than a maximum number of PDCCH candidates supported by a terminal includes:

dropping part or all of control channel elements of the at least one search space in the first search space set in a case that the total number of target PDCCH candidates is greater than a maximum total number of PDCCH candidates of a target cell that are supported by the terminal; where the total number of target PDCCH candidates is a sum of the number of PDCCH candidates of all search spaces in M search spaces in a target time unit, the M search spaces are search spaces in the first search space set corresponding to the target cell, and the target time unit is a time unit for overbooking in the target cell.

It should be noted that, in this embodiment, in a cell not supporting overbooking, the network device can ensure that the total number of PDCCH candidates in all search spaces of the cell in each time unit does not exceed the number of PDCCH candidates supported by the cell in each time unit. In a cell supporting overbooking, if the total number of PDCCH candidates in all search spaces in a time unit configured with overbooking exceeds the maximum number of PDCCH candidates supported by the cell in this time unit, PDCCH candidates may be dropped according to some dropping rules, until the total number of PDCCH candidates in all the search spaces in the time unit configured with overbooking does not exceed the maximum number of PDCCH candidates supported by the cell in this time unit.

Optionally, the target cell is a first cell or a PCell. That is, overbooking may be implemented for the SCell, or overbooking may be implemented for the PCell.

A time length of the target time unit is determined based on an SCS of the target cell. For example, when the PCell supports overbooking of the number of PDCCH candidates, the SCS of the PCell is used for determining a time length of a corresponding slot and/or span that supports overbooking. When the first cell supports overbooking of the number of PDCCH candidates, the SCS of the first cell is used for determining a time length of a corresponding slot and/or span that supports overbooking.

Optionally, in an embodiment, in a case that the target cell is the PCell, priorities of search spaces in the first search space set corresponding to the PCell satisfies any one of the following:

a priority of a user-specific search space USS for self-scheduling of the PCell is higher than a priority of a third search space and is lower than a priority of a common search space CSS for self-scheduling of the PCell; and a priority of the third search space is higher than a priority of the USS for self-scheduling of the PCell, and is lower than the priority of the USS for self-scheduling of the PCell; where the third search space is a search space for scheduling the PCell by the SCell.

In this embodiment, the search space for scheduling the PCell by the SCell is a USS. It should be noted that when a plurality of SCells can perform cross-carrier scheduling of the PCell, priorities of the cells may be defined. For example, in a case that L1 first cells are present, priorities of the L1 first cells satisfy at least one of the following:

a priority of a first cell with a first index value is higher than a priority of a first cell with a second index value, and the first index value is greater than or less than the second index value;

a priority of a third cell is higher than priorities of cells other than the third cell in the L1 first cells; or a priority of a third cell with a third index value is higher than a priority of a third cell with a fourth index value, and the third index value is greater than or less than the fourth index value; where L1 is an integer greater than 1, and the third cell is a cell simultaneously scheduling the PCell and the SCell in the L1 first cells.

In this embodiment, the priorities of the SCells may be understood as priorities of scheduling the PCell by the SCells, or may be understood as priorities of search spaces for scheduling the PCell by the SCells. For example, an SCell with a small SCell index value (SCell index) has a higher priority, or an SCell with a third-cell feature has a higher priority; and if a plurality of SCells have this feature, an SCell with a small SCell index value has a higher priority.

Optionally, in another embodiment, in a case that the target cell is the PCell, priorities of search spaces in the first search space set corresponding to the PCell satisfies: a priority of a CSS for self-scheduling of the PCell is greater than that of a USS in the first cell.

In this embodiment, a USS with a smaller index value (ID) has a higher priority or a USS with a characteristic T has a higher priority. If a plurality of USSs have a same index value, a cell with a smaller index has a higher priority or an SCell with a three-cell characteristic has a higher priority; or if a plurality of SCells have this feature, an SCell with a small SCell index value has a higher priority.

Optionally, in a case that L2 USSs are present, priorities of the L2 USSs satisfy at least one of the following:

a priority of a first USS is higher than a priority of a second USS, and an index value of the first USS is greater than or less than an index value of the second USS;

a priority of a third USS is higher than a priority of a fourth USS, the third USS and the fourth USS are USSs with a same index value in the L2 USSs, and a cell index corresponding to the third USS is greater than or less than a cell index corresponding to the fourth USS;

a priority of USSs corresponding to M third cells is higher than a priority of a USS corresponding to a fourth cell, the third cell is a cell simultaneously scheduling the PCell and the SCell in first cells corresponding to the L2 USSs, and the USS corresponding to the fourth cell is a USS in the L2 USSs other than the USSs corresponding to the M third cells; or a fifth USS has a higher priority than a sixth USS, the fifth USS and the sixth USS are both USSs in the USSs corresponding to the M third cells, and a cell index corresponding to the fifth USS is greater than or less than a cell index corresponding to the sixth USS; where L2 is an integer greater than 1.

It should be noted that a dropping rule for dropping part or all of the PDCCH candidates of the at least one search space includes:

dropping part or all of the PDCCH candidates in the search space in descending order or ascending order of indexes of the search spaces.

Further, the Dropping Rule Further Includes:

dropping the PDCCH candidates in ascending order of priorities by using PDCCH candidates in the search spaces as units.

Optionally, in a case that the target cell is the PCell, the dropping rule further includes:

a dropping priority of search spaces in a third time unit is greater than a dropping priority of search spaces in a fourth time unit, where the third time unit and the fourth time unit are both time units in the target time unit, and the third time unit is earlier or later than the fourth time unit.

Based on the dropping rule, the following uses blind detection as an example to describe in detail a process of dropping PDCCH candidates.

In an embodiment, in a case that the target cell is a PCell, if one slot and/or one span of the SCell corresponds to one or more slots and/or one or more spans of the PCell, in each slot or each span of the SCell, using an SS as a unit, an SS with a smaller ID has a higher priority, and the user drops all PDCCH candidates of an SS sequentially in descending order of SS IDs until the number of blind detections does not exceed the maximum number of blind detections supported by the UE.

Optionally, the user first uses a PDCCH candidate in the SS as a unit, and then uses the SS as a unit, for dropping the number of blind detections. Alternatively, the following dropping steps may be included:

Step 1: Using a PDCCH candidate in the SS as a unit, with a PDCCH candidate of a higher or lower aggregation level having a higher priority, the user drops PDCCH candidates of an SS sequentially in descending order or ascending order of ALs required for forming PDCCH candidates.

Step 2: If the maximum number of blind detections supported by the UE is still exceeded after all the PDCCH candidates in the SS are dropped, use the SS as a unit and drop candidates in descending order of SS IDs by using the method of Step 1. Step 1 and Step 2 are repeated until the number of blind detections does not exceed the maximum number of blind detections supported by the UE.

In another embodiment, in a case that the target cell is a PCell, if a plurality of slots and/or a plurality of spans of the SCell correspond to one slot and/or one span of the PCell, the following methods may be used to drop the PDCCH candidates:

Method 1: The order of priority is: in one earlier or later overlapped slot and/or span, first use the method corresponding to the foregoing steps 1 and 2 to perform dropping of blind detection by using the SS or the PDCCH candidate in the SS as a unit; and if the maximum number of blind detections supported by the user is still exceeded after dropping of blind detection, use the method corresponding to the foregoing steps 1 and 2 to perform dropping of blind detection in a next or previous slot and/or a next or previous span, until the number of blind detections does not exceed the maximum number of blind detections supported by the UE.

Method 2: The order of priority is: in all overlapped slots and/or spans, use the method corresponding to the foregoing steps 1 and 2 to perform dropping of blind detection by using the SS or the PDCCH candidate in the SS as a unit; and when a plurality of SSs have a same SS ID and/or a plurality of PDCCH candidates have a same aggregation level, that with a smaller or larger slot index/span index have a higher priority.

In yet another embodiment, in a case that the target cell is a first cell, in each slot or each span of the SCell, using the SS as a unit, an SS with a smaller ID has a higher priority. The user drops all PDCCH candidates of an SS sequentially in descending order of SS IDs until the number of blind detections does not exceed the maximum number of blind detections supported by the UE.

Optionally, the user first uses the PDCCH candidate in the SS as a unit, and then uses the SS as a unit, for dropping the number of blind detections. Alternatively, the following dropping steps may be included:

Step 3: Using a PDCCH candidate in the SS as a unit, with a PDCCH candidate of a higher or lower aggregation level having a higher priority, the user drops PDCCH candidates of an SS sequentially in descending order or ascending order of ALs required for forming PDCCH candidates.

Step 4: If the maximum number of blind detections supported by the UE is still exceeded after all the PDCCH candidates in the SS are dropped, use the SS as a unit and drop candidates in descending order of SS IDs by using the method of Step 1. Step 3 and Step 4 are repeated until the number of blind detections does not exceed the maximum number of blind detections supported by the UE.

The DCI transmission method provided in this embodiment of this application can support both self-scheduling of one cell and scheduling by another cell. For example, for monitoring on scheduling DCI for the PCell on both the PCell and the SCell, the maximum number of PDCCH candidates for blind detection of the UE, the maximum number of non-overlapping CCEs, and the like are allocated in the two scheduling cells. This can help the network device maximize use of the blind detection capability of the user and avoid multi-user blocking. In addition, this application provides a method for dropping blind detections on a cell supporting overbooking when the maximum number of blind detections exceeds the user capability, preferentially implementing important blind detections and guaranteeing network performance.

For better understanding of this application, specific examples of blind detections in this application are described in detail below.

Figure 6:
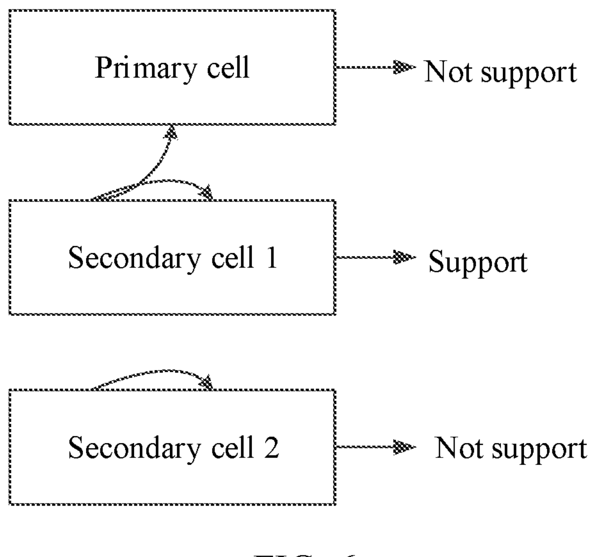
FIG. 6 is a first example diagram of overbooking-supported cells in a DCI transmission method according to an embodiment of this application.
Figure 7:
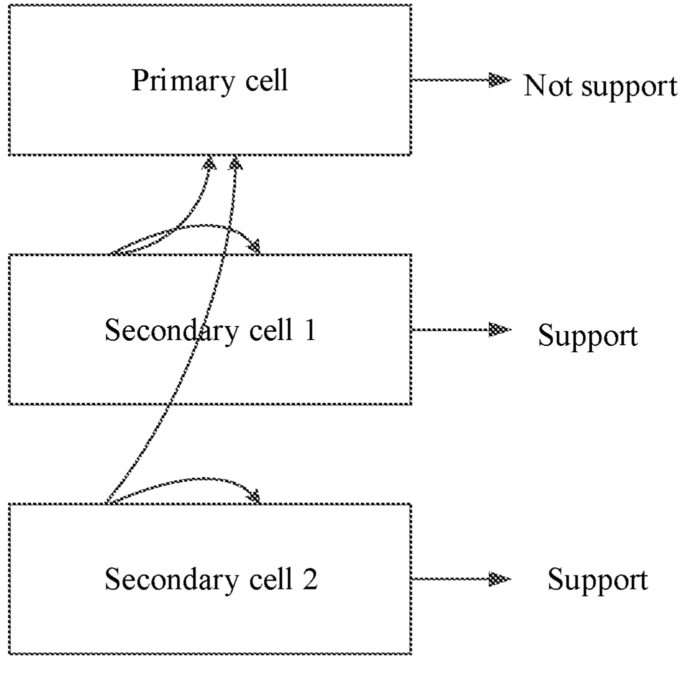
FIG. 7 is a second example diagram of overbooking-supported cells in a DCI transmission method according to an embodiment of this application.
Figures 8, 9:
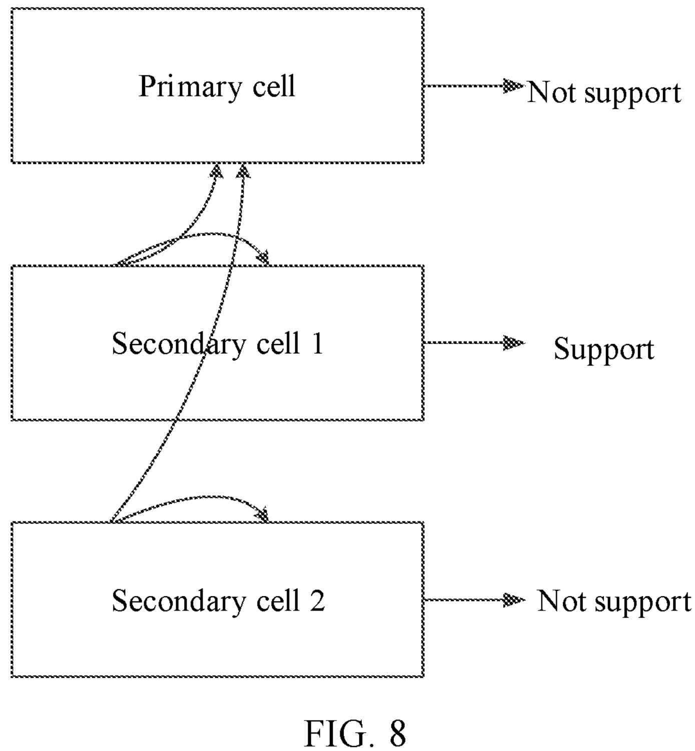
FIG. 8 is a third example diagram of overbooking-supported cells in a DCI transmission method according to an embodiment of this application.
FIG. 9 is a fourth example diagram of overbooking-supported cells in a DCI transmission method according to an embodiment of this application.

In an embodiment, a cell that supports PDCCH overbooking is a scheduling cell, including the following cases:

Case 1: In a case that the PCell has no self-carrier scheduling, the overbooking-supported case is described with reference to FIG. 6 to FIG. 8. As shown in FIG. 6, in a case that only one SCell is supported to schedule the PCell, the cell that supports overbooking is a secondary cell 1; as shown in FIG. 7, in a case that a plurality of SCells are supported to schedule the PCell, and all the SCells support overbooking, the cells that support overbooking are a secondary cell 1 and a secondary cell 2; as shown in FIG. 8, in a case that a plurality of SCells are supported to schedule the PCell and only an SCell with a smallest SCell index value supports overbooking, the cell that supports overbooking is a secondary cell 1.

Figure 10:
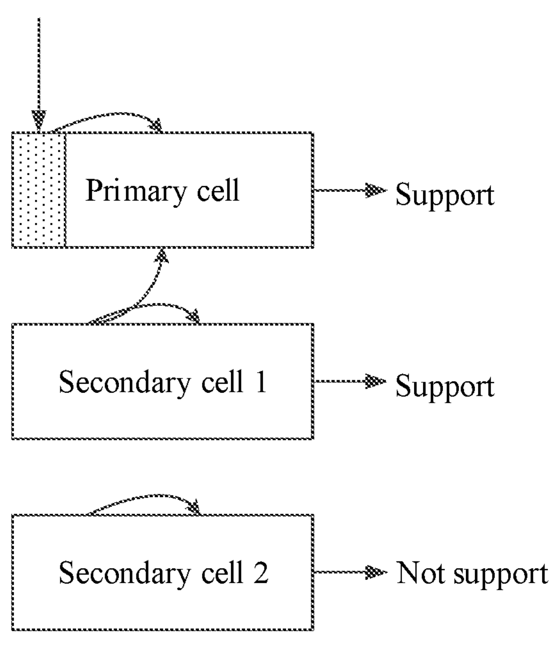
FIG. 10 is a fifth example diagram of overbooking-supported cells in a DCI transmission method according to an embodiment of this application.

Case 2: In a case that the PCell has self-carrier scheduling, the overbooking-supported case is described with reference to FIG. 9 and FIG. 10. As shown in FIG. 9, when a first-type CSS is for self-carrier scheduling, cells that support overbooking are a secondary cell 1 and the primary cell. As shown in FIG. 10, when a USS and/or a second-type CSS are for self-carrier scheduling, a cell that supports overbooking is a secondary cell 1.

In another embodiment, when a cell supporting PDCCH overbooking is a scheduled cell, that is, the PCell, regardless of whether the PCell has self-carrier scheduling, the cell supporting overbooking is the PCell.

In yet another embodiment, when a cell supporting PDCCH overbooking is a scheduling cell and a scheduled cell, the PCell is added as a cell supporting overbooking for any one cases in the foregoing case 1.

Optionally, when the maximum number of blind detections supported by the UE is exceeded, the method for dropping blind detections in the search space by the UE includes the following methods:

Method 1: When the PCell supports overbooking of the number of blind detections, use the SCS of the PCell to determine a time length of a corresponding slot and/or span that supports overbooking.

Figure 11:
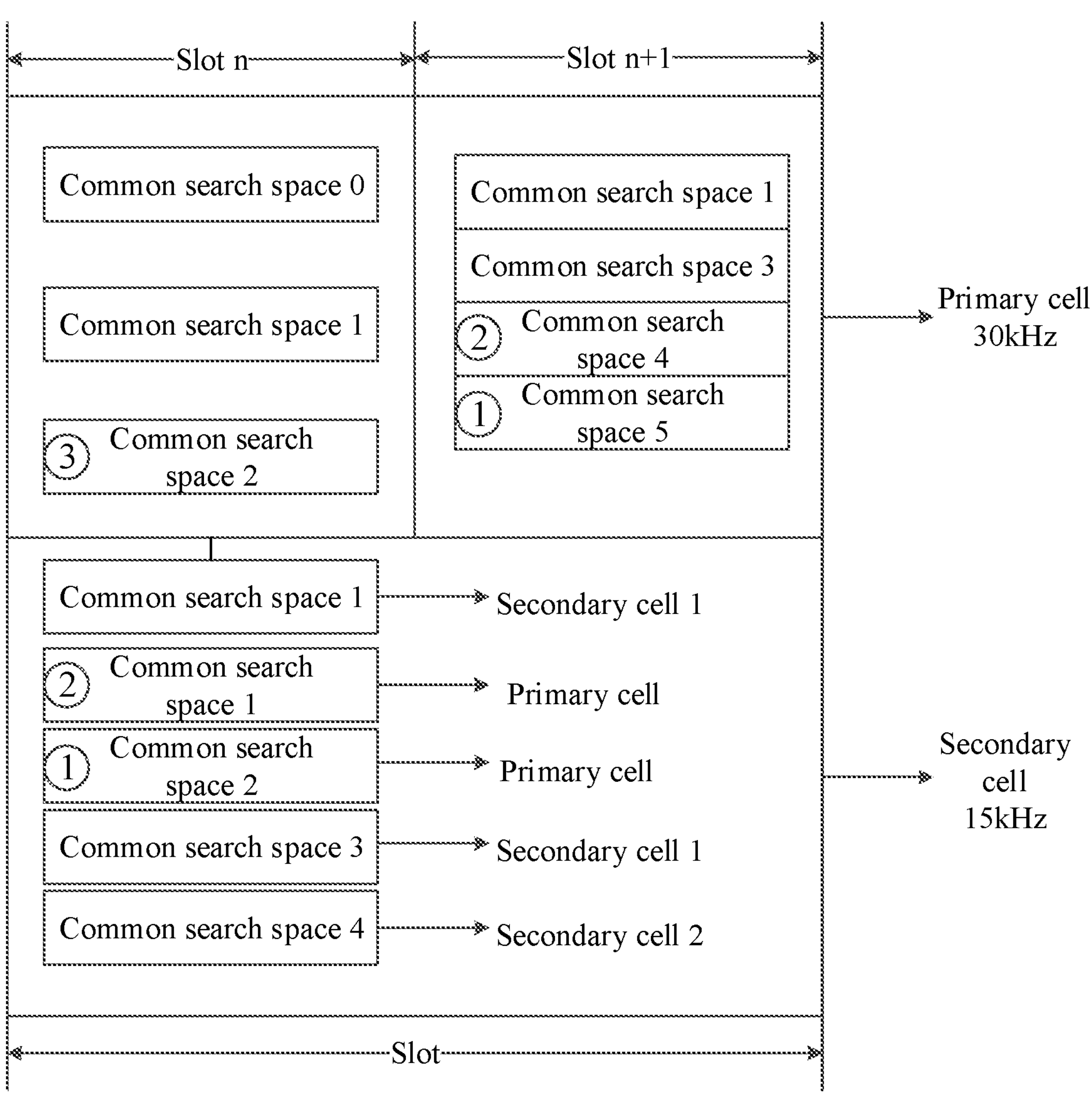
FIG. 11 is a first example diagram of SS dropping in a DCI transmission method according to an embodiment of this application.

Optionally, one slot of the SCell corresponds to one or more slots of the PCell. As shown in FIG. 11, the maximum number of blind detections supported by the user on the PCell is 2, and in Slot n on the PCell, self-scheduling of the PCell has a higher priority than cross-carrier scheduling by the SCell, and a USS with a largest SS ID for scheduling the PCell by the SCell is first dropped, for example, a USS #2, and then a USS #1. There is no SS for scheduling the PCell on the SCell. However, the number of blind detections of the PCell still exceeds 2, and then an SS on the PCell is dropped. A USS has a lower priority than the CSS, and an SS with a larger SS ID has a lower priority. Then, the same method is used for processing in slot n+1.

Figure 12:
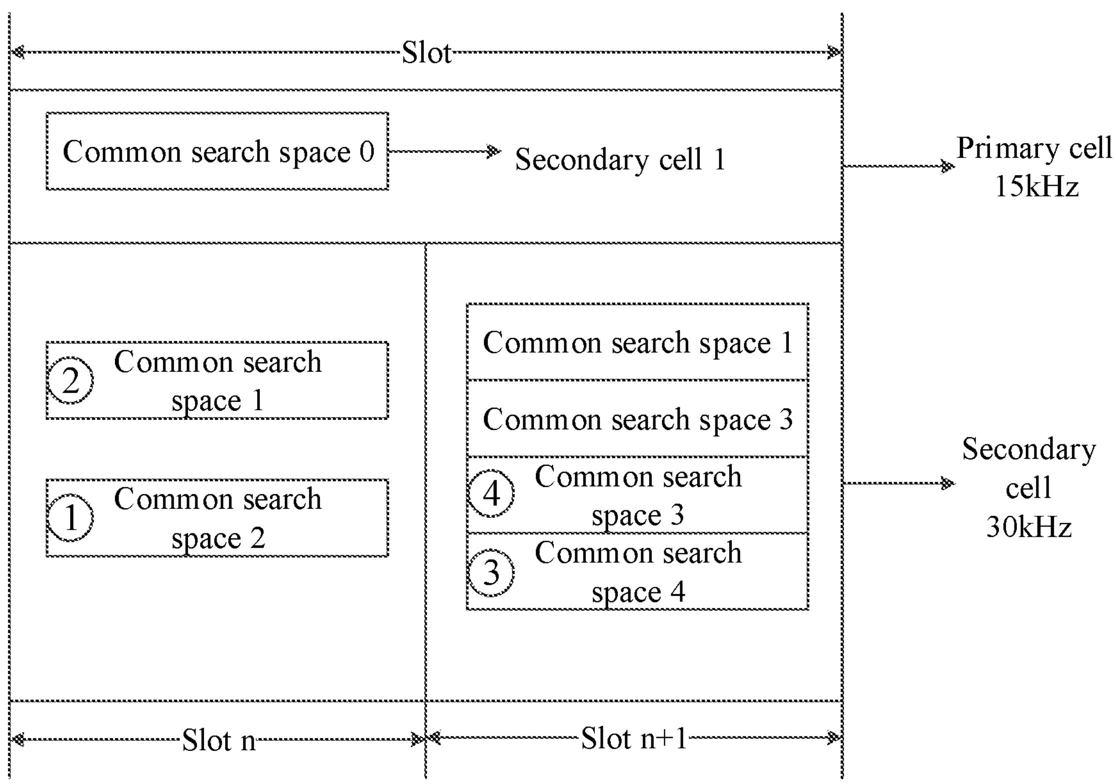
FIG. 12 is a second example diagram of SS dropping in a DCI transmission method according to an embodiment of this application.
Figure 13:
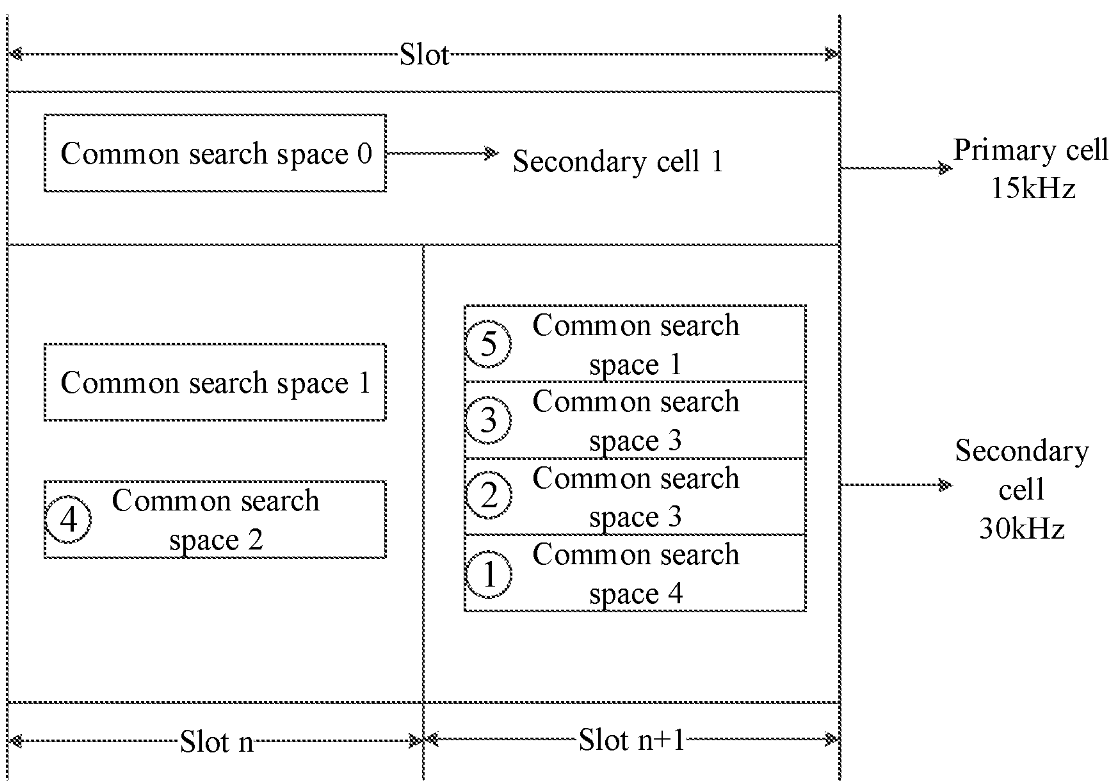
FIG. 13 is a third example diagram of SS dropping in a DCI transmission method according to an embodiment of this application.

Optionally, a plurality of slots of the SCell correspond to one slot of the PCell. As shown in FIG. 12 and FIG. 13, USSs are all used for scheduling the PCell. In FIG. 12, the maximum number of blind detections supported by the user on the PCell is 3. First, in one earliest overlapped slot of the SCell, namely, slot n, SS dropping is performed. If the maximum number of blind detections supported by the user is still exceeded after dropping of blind detection, SS dropping is performed in a next slot, namely, slot (n+1). In each slot, an SS with a larger SS ID has a lower priority. In FIG. 13, the maximum number of blind detections supported by the user on the PCell is 2, and the method corresponding to the foregoing steps 1 and 2 is used to perform SS dropping on all overlapped slots in a unit of SS. When a plurality of SSs have a same SS ID, an SS with a larger slot index has a lower priority.

Figure 14:
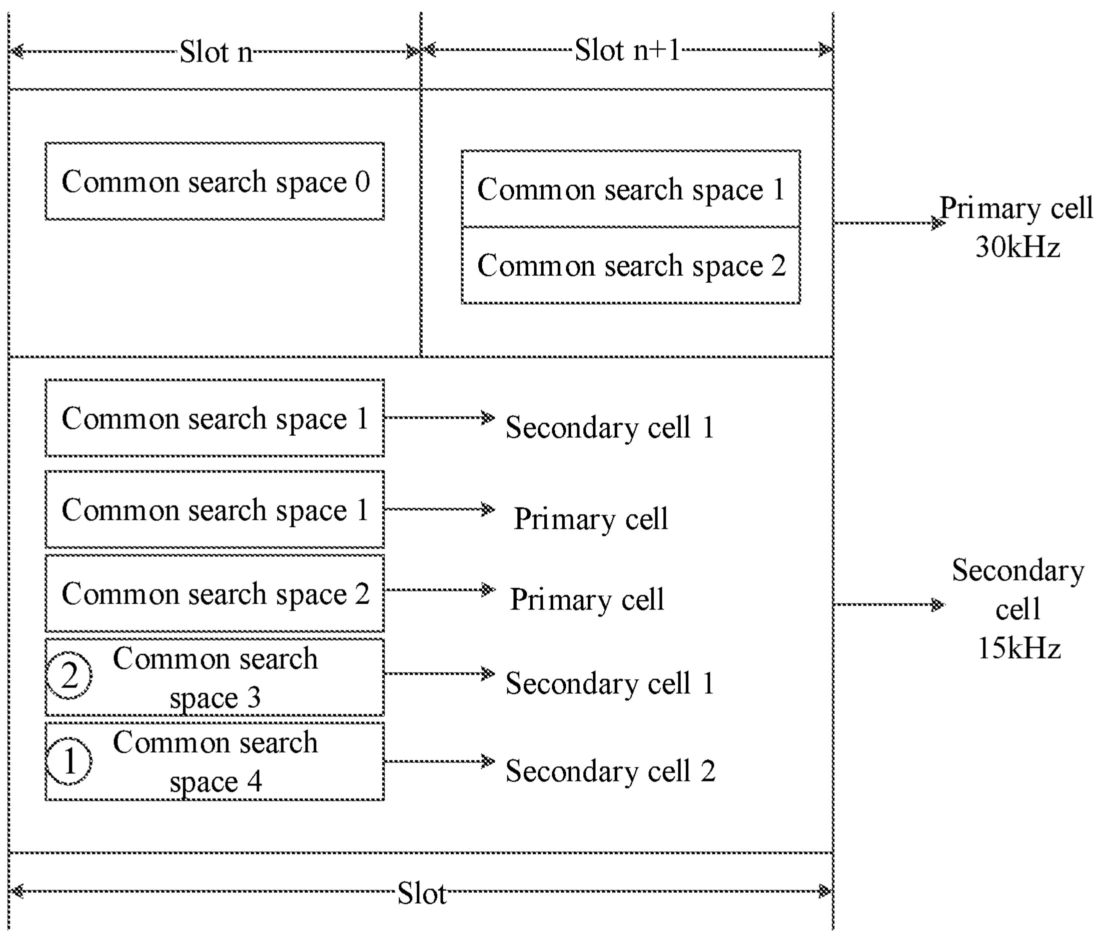
FIG. 14 is a fourth example diagram of SS dropping in a DCI transmission method according to an embodiment of this application.

Method 2: Use the SCS of the SCell to determine a time length of the slot, where each slot or each span of the SCell can support overbooking. As shown in FIG. 14, the maximum number of blind detections supported by the user on the SCell is 3. Regardless of whether the SCS of the SCell is the same as that of the PCell, the user uses the method corresponding to the foregoing steps 1 and 2 to perform dropping of blind detection in each slot on the SCell in a unit of SS. The priority is defined as: CSS for self-scheduling of the SCell>USS for cross-carrier scheduling of the PCell by the SCell>USS for self-scheduling of the SCell>USS for cross-carrier scheduling of other SCells by the SCell. An SCell with a smaller SS ID have a higher priority.

It should be noted that, in FIG. 11 to FIG. 14, numbers in the circles indicate an order of dropping.

It should be noted that, for the DCI transmission method provided in the embodiments of this application, the execution body may be a DCI transmission apparatus, or a control module for executing the DCI transmission method in the DCI transmission apparatus. In the embodiments of this application, the DCI transmission method being performed by the DCI transmission apparatus is used as an example to describe the DCI transmission apparatus provided in the embodiments of this application.

Figure 15:
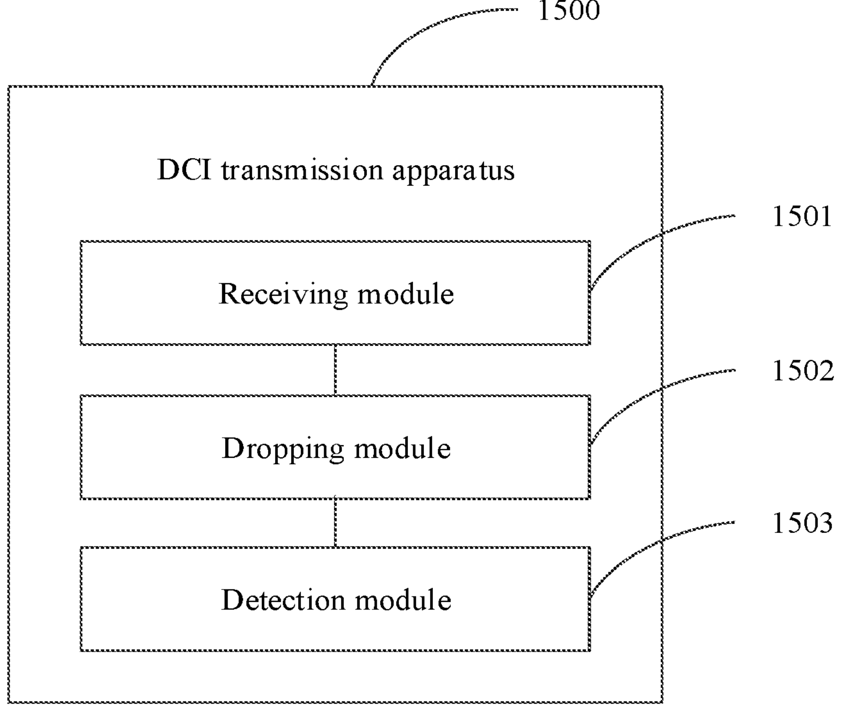
FIG. 15 is a structural diagram of a DCI transmission apparatus according to an embodiment of this application.

Referring to FIG. 15, FIG. 15 is a structural diagram of a DCI transmission apparatus according to an embodiment of this application. As shown in FIG. 15, the DCI transmission apparatus 1500 includes:

- a receiving module 1501, configured to transmit configuration information, where the configuration information is used for allocating N search space sets, and N is a positive integer;
- a dropping module 1502, configured to drop part or all of PDCCH candidates of at least one search space in a first search space set in a case that the number of PDCCH candidates in the first search space set is greater than a maximum number of PDCCH candidates supported by a terminal, so as to obtain a second search space set; and
- a detection module 1503, configured to transmit DCI on the second search space set.

The first search space set is any one of the N search space sets, at least one search space set in the N search space sets includes a first search space, the first search space is a search space for scheduling a second cell by a first cell, the first cell is a secondary cell SCell, and the number of PDCCH candidates in the second search space set is less than or equal to the maximum number of PDCCH candidates supported by the terminal.

Optionally, the configuration information is further used for allocating a corresponding quantity of PDCCH candidates for each of the search space sets.

Optionally, the maximum number of PDCCH candidates supported by the terminal includes at least one of the following:

- a maximum number X of PDCCH candidates corresponding to self-scheduling of a primary cell PCell;
- a maximum number Y of cross-carrier PDCCH candidates corresponding to scheduling of the PCell by the first cell;
- a maximum number P of PDCCH candidates supported by the PCell;
- a maximum number S of PDCCH candidates supported by the first cell;
- a maximum number F of PDCCH candidates corresponding to self-scheduling of the first cell; or
- a maximum number O of PDCCH candidates corresponding to scheduling of SCells other than the first cell by the first cell.

Optionally, Y Includes any One of the Following:

- a maximum number of PDCCH candidates using a first time unit in the first cell; and
- a maximum number of PDCCH candidates using a second time unit in the first cell; where
- the first time unit is a time unit for a subcarrier spacing SCS of the first cell, and the second time unit is a time unit for an SCS of the PCell.

Optionally, P Satisfies at Least One of the Following:

- in a case that the number of PDCCH candidates of a third search space belongs to the number of PDCCH candidates of the PCell and Y is the maximum number of PDCCH candidates using the first time unit in the first cell, $P=X+(2^{\mu})*Y$, where $$\mu = \frac{\mu_2}{\mu_1},$$

$\mu_1$ is the SCS of the PCell, and $\mu_2$ is the SCS of the first cell;

- in a case that the number of PDCCH candidates of the third search space belongs to the number of PDCCH candidates of the PCell and Y is the maximum number of PDCCH candidates using the second time unit in the first cell, P=X+Y; or
- in a case that the number of PDCCH candidates of the third search space belongs to the number of PDCCH candidates of the first cell, P=X; where
- the third search space is a search space for scheduling the PCell by the SCell.

Optionally, the number of PDCCH candidates of the second search space set being less than or equal to the maximum number of PDCCH candidates supported by the terminal includes at least one of the following:

- the number of PDCCH candidates of a second search space in each second time unit is less than or equal to X, and the second search space is a search space for self-scheduling of the PCell;
- in a case that the number of PDCCH candidates of a third search space belongs to the number of PDCCH candidates of the PCell, the number of PDCCH candidates of the third search space in each second time unit is less than or equal to a first value; or
- in a case that the number of PDCCH candidates of the third search space belongs to the number of PDCCH candidates of the first cell, the number of PDCCH candidates of the third search space in each first time unit is less than or equal to a second value; where
- the first time unit is a time unit for an SCS of the first cell, the second time unit is a time unit for an SCS of the PCell, and the third search space is a search space for scheduling the PCell by the SCell.

Optionally, the First Value Satisfies at Least One of the Following:

- in a case that Y is the maximum number of PDCCH candidates using the first time unit in the first cell, the first value is $(2^{\mu})*Y$, where $$\mu = \frac{\mu_2}{\mu_1},$$

$\mu_1$ is the SCS of the PCell, and $\mu_2$ is the SCS of the first cell; or

- in a case that Y is the maximum number of PDCCH candidates using the first time unit in the PCell, the first value is Y.

Optionally, the Second Value Satisfies at Least One of the Following:

in a case that Y is the maximum number of PDCCH candidates using the first time unit in the first cell, the second value is Y; or in a case that Y is the maximum number of PDCCH candidates using the second time unit in the PCell, the second value is $$\left(2^{\frac{1}{\mu}}\right) * Y,$$

where $$\mu = \frac{\mu_2}{\mu_1},$$

$\mu_1$ is the SCS of the PCell, and $\mu_2$ is the SCS of the first cell.

Optionally, in a case that the PCell supports overbooking of the number of PDCCH candidates, the second search space set corresponding to the PCell satisfies at least one of the following:

in a case that Y is the maximum number of PDCCH candidates using a first time unit in the first cell, a sum of the number of PDCCH candidates in a second search space and the number of PDCCH candidates in a third search space is less than or equal to $X+(2^{\mu})*Y$;

in a case that Y is the maximum number of PDCCH candidates using a second time unit in the PCell, a sum of the number of PDCCH candidates in the third search space and the number of PDCCH candidates in the second search space is less than or equal to X+Y; or a sum of the number of PDCCH candidates in the first search space and the number of PDCCH candidates in the second search space is less than or equal to P;

where $$\mu = \frac{\mu_2}{\mu_1},$$

$\mu_1$ is an SCS of the PCell, $\mu_2$ is an SCS of the first cell, the first time unit is a time unit for an SCS of the first cell, the second time unit is a time unit for an SCS of the PCell, the second search space is a search space for self-scheduling of the PCell, and the third search space is a search space for scheduling the PCell by the SCell.

Optionally, in a case that the first cell supports overbooking of the number of PDCCH candidates, the second search space set corresponding to the first cell satisfies at least one of the following:

the number of PDCCH candidates in a second search space is less than or equal to P; or in a case that the number of PDCCH candidates of a third search space belongs to the number of PDCCH candidates of the first cell, the number of PDCCH candidates of the third search space is less than or equal to Y, and a preset condition is satisfied; where the second search space is a search space for self-scheduling of the PCell, and the third search space is a search space for scheduling the PCell by the SCell.

Optionally, the Preset Condition Includes at Least One of the Following:

in a case that Y is the maximum number of PDCCH candidates using a first $\leqslant$ time unit in the first cell, $Y+F+O \leqslant S$; or in a case that Y is the maximum number of PDCCH candidates using a second time unit in the PCell, $$\left(2^{\frac{1}{\mu}}\right) * Y + F + O \leqslant S;$$

where the first time unit is a time unit for an SCS of the first cell, and the second time unit is a time unit for an SCS of the PCell.

Optionally, the second cell is an SCell or a PCell.

Optionally, the dropping module 1502 is further configured to: drop part or all of the PDCCH candidates of the at least one search space in the first search space set in a case that a total number of target PDCCH candidates is greater than a maximum total number of PDCCH candidates of a target cell that are supported by the terminal; where the total number of target PDCCH candidates is a sum of the number of PDCCH candidates of all search spaces in M search spaces in a target time unit, the M search spaces are search spaces in the first search space set corresponding to the target cell, and the target time unit is a time unit for overbooking in the target cell.

Optionally, the target cell is a first cell or a PCell.

Optionally, a time length of the target time unit is determined based on an SCS of the target cell.

Optionally, in a case that the target cell is the PCell, priorities of search spaces in the first search space set corresponding to the PCell satisfies any one of the following:

a priority of a user-specific search space USS for self-scheduling of the PCell is higher than a priority of a third search space, and is lower than a priority of a common search space CSS for self-scheduling of the PCell; and a priority of the third search space is higher than a priority of the USS for self-scheduling of the PCell, and is lower than the priority of the USS for self-scheduling of the PCell; where the third search space is a search space for scheduling the PCell by the SCell.

Optionally, in a case that L1 first cells are present, priorities of the L1 first cells satisfy at least one of the following:

a priority of a first cell with a first index value is higher than a priority of a first cell with a second index value, and the first index value is greater than or less than the second index value;

a priority of a third cell is higher than priorities of cells other than the third cell in the L1 first cells; or a priority of a third cell with a third index value is higher than a priority of a third cell with a fourth index value, and the third index value is greater than or less than the fourth index value; where L1 is an integer greater than 1, and the third cell is a cell simultaneously scheduling the PCell and the SCell in the L1 first cells.

Optionally, in a case that the target cell is the PCell, priorities of search spaces in the first search space set corresponding to the PCell satisfies: a priority of a CSS for self-scheduling of the PCell is greater than that of a USS in the first cell.

Optionally, in a case that L2 USSs are present, priorities of the L2 USSs satisfy at least one of the following:

a priority of a first USS is higher than a priority of a second USS, and an index value of the first USS is greater than or less than an index value of the second USS;

a priority of a third USS is higher than a priority of a fourth USS, the third USS and the fourth USS are USSs with a same index value in the L2 USSs, and a cell index corresponding to the third USS is greater than or less than a cell index corresponding to the fourth USS;

a priority of USSs corresponding to M third cells is higher than a priority of a USS corresponding to a fourth cell, the third cell is a cell simultaneously scheduling the PCell and the SCell in first cells corresponding to the L2 USSs, and the USS corresponding to the fourth cell is a USS in the L2 USSs other than the USSs corresponding to the M third cells; or a fifth USS has a higher priority than a sixth USS, the fifth USS and the sixth USS are both USSs in the USSs corresponding to the M third cells, and a cell index corresponding to the fifth USS is greater than or less than a cell index corresponding to the sixth USS; where L2 is an integer greater than 1.

Optionally, in a case that the target cell is the first cell, priorities of search spaces in the first search space set corresponding to the first cell satisfies any one of the following:

a CSS for self-scheduling of the first cell has a higher priority than a USS for scheduling of the PCell by the first cell, the USS for scheduling of the PCell by the first cell has a higher priority than a USS for self-scheduling of the first cell, and the USS for self-scheduling of the first cell has a higher priority than a USS for cross-carrier scheduling of the SCell by the first cell;

the CSS for self-scheduling of the first cell has a higher priority than the USS for self-scheduling of the first cell, the USS for self-scheduling of the first cell has a higher priority than the USS for scheduling of the PCell by the first cell, and the USS for scheduling of the PCell by the first cell has a higher priority than the USS for cross-carrier scheduling of the SCell by the first cell; and the CSS for self-scheduling of the first cell has a higher priority than the USS for self-scheduling of the first cell and the first search space set.

Optionally, a dropping rule for dropping part or all of the PDCCH candidates of the at least one search space includes:

dropping part or all of the PDCCH candidates in the search space in descending order or ascending order of indexes of the search spaces.

Optionally, the Dropping Rule Further Includes:

dropping the PDCCH candidates in ascending order of priorities by using PDCCH candidates in the search spaces as units.

Optionally, in a case that the target cell is the PCell, the dropping rule further includes:

a dropping priority of search spaces in a third time unit is greater than a dropping priority of search spaces in a fourth time unit, where the third time unit and the fourth time unit are both time units in the target time unit, and the third time unit is earlier or later than the fourth time unit.

The DCI transmission apparatus in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (Network Attached Storage, NAS), a personal computer (personal computer, PC), a television (television, TV), a teller machine, a self-service machine, or the like, which is not specifically limited in this embodiment of this application.

The DCI transmission apparatus in this embodiment of this application may be an apparatus with an operating system. The operating system may be an Android (Android) operating system, an iOS operating system, or other possible operating systems, and is not specifically limited in this embodiment of this application.

The DCI transmission apparatus provided in this embodiment of this application can implement the processes implemented in the method embodiment in FIG. 3, with the same technical effects achieved. To avoid repetition, details are not described herein again.

Figure 16:
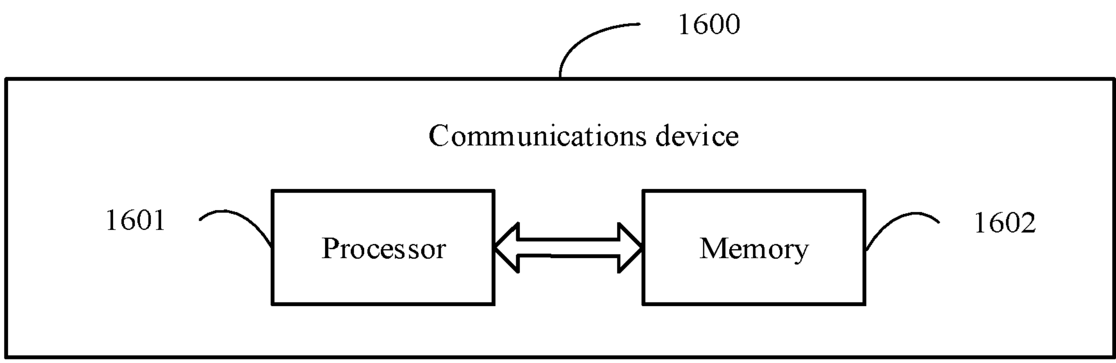
FIG. 16 is a structural diagram of a communications device according to an embodiment of this application.

Optionally, as shown in FIG. 16, an embodiment of this application further provides a communications device 1600. The communications device 1600 is a terminal, including a processor 1601, a memory 1602, and a program or an instruction stored in the memory 1602 and capable of running on the processor 1601. For example, when the communications device 1600 is a terminal and when the program or the instruction is executed by the processor 1601, the processes of the foregoing embodiment of the DCI transmission method are implemented, with the same technical effects achieved. When the communications device 1600 is a network device and when the program or the instruction is executed by the processor 1601, the processes of the foregoing embodiment of the DCI transmission method are implemented, with the same technical effects achieved. To avoid repetition, details are not described herein again.

Figure 17:
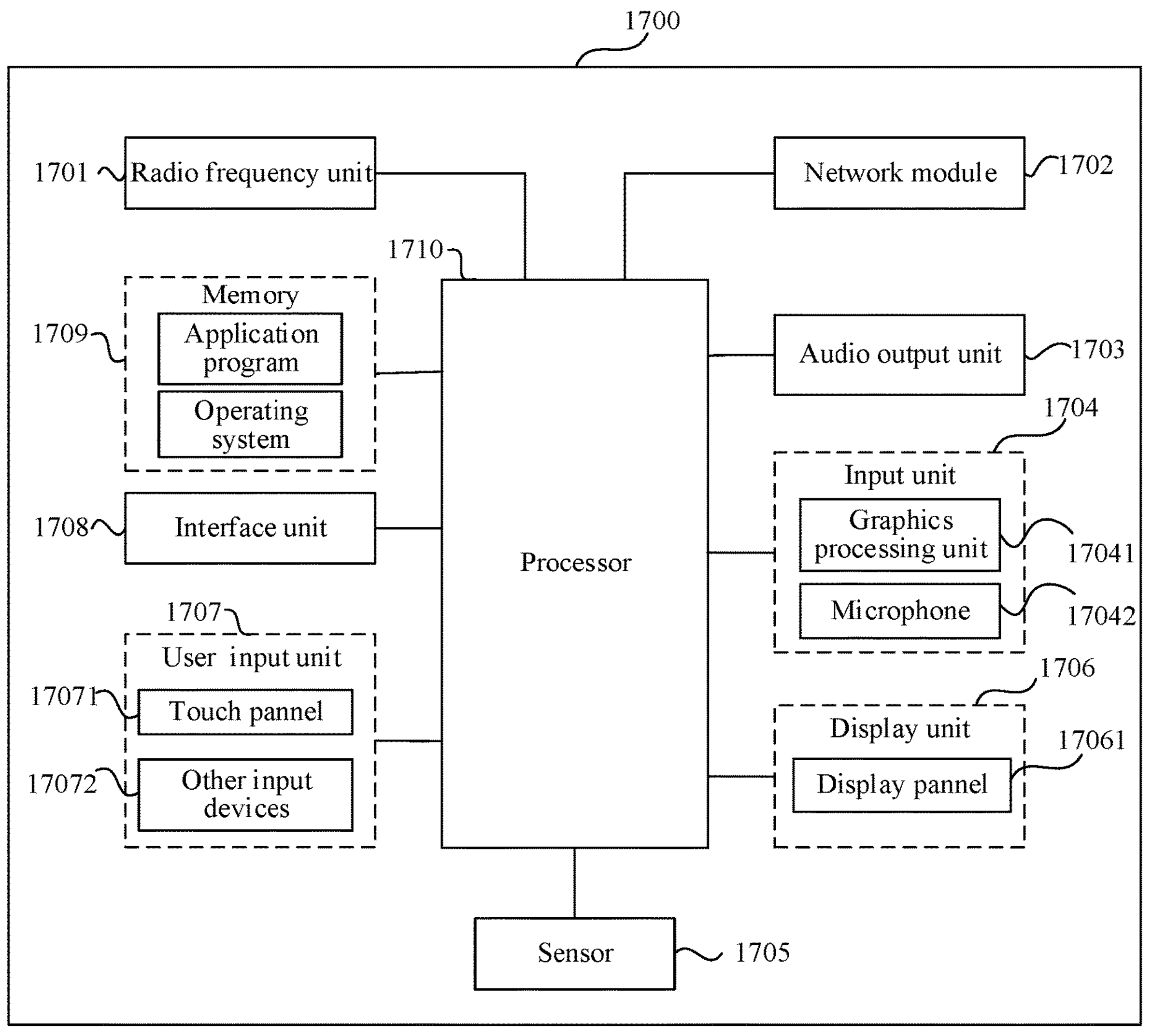
FIG. 17 is a structural diagram of a terminal according to an embodiment of this application.

FIG. 17 is a schematic diagram of a hardware structure of a terminal for implementing the embodiments of this application.

The terminal 1700 includes but is not limited to components such as a radio frequency unit 1701, a network module 1702, an audio output unit 1703, an input unit 1704, a sensor 1705, a display unit 1706, a user input unit 1707, an interface unit 1708, a memory 1709, and a processor 1710.

Persons skilled in the art can understand that the terminal 1700 may further include a power supply (for example, a battery) supplying power to the components, and the power supply may be logically connected to the processor 1710 through a power management system. In this way, functions such as charge management, discharge management, and power consumption management are implemented by using the power management system. The structure of the terminal shown in FIG. 17 does not constitute any limitation on the terminal. The terminal may include more or fewer components than those shown in FIG. 17, or a combination of some components, or the components disposed differently. Details are not described herein again.

It can be understood that in this embodiment of this application, the input unit 1704 may include a graphics processing unit (Graphics Processing Unit, GPU) 17041 and a microphone 17042. The graphics processing unit 17041 processes image data of a still picture or video obtained by an image capture apparatus (such as a camera) in a video capture mode or an image capture mode. The display unit 1706 may include a display panel 17061, and the display panel 17061 may be configured in a form of a liquid crystal display, an organic light-emitting diode, and the like. The user input unit 1707 may include a touch panel 17071 and other input devices 17072. The touch panel 17071 is also referred to as a touchscreen. The touch panel 17071 may include two parts: a touch detection apparatus and a touch controller. The other input devices 17072 may include but are not limited to a physical keyboard, a function key (such as a volume control key or a power on/off key), a trackball, a mouse, a joystick, and the like. Details are not described herein.

In this embodiment of this application, the radio frequency unit 1701 receives downlink data from a network device, and then sends the downlink data to the processor 1710 for processing; and also sends uplink data to the network device. Generally, the radio frequency unit 1701 includes but is not limited to an antenna, at least one amplifier, a transceiver, a coupler, a low noise amplifier, a duplexer, and the like.

The memory 1709 may be configured to store software programs or instructions and various data. The memory 109 may include a program or instruction storage area and a data storage area. The program or instruction storage area may store an operating system, an application program or instruction required by at least one function (for example, a sound playback function or an image playback function), and the like. In addition, the memory 1709 may include a high-speed random access memory, and may further include a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory, for example, at least one disk storage device, a flash memory device, or another volatile solid-state storage device.

The processor 1710 may include one or more processing units. Optionally, an application processor and a modem processor may be integrated in the processor 1710. The application processor primarily processes an operating system, user interfaces, application programs or instructions, and the like. The modem processor primarily processes radio communication, for example, being a baseband processor. It can be understood that the modem processor may alternatively be not integrated in the processor 1710.

The radio frequency unit 1701 is configured to transmit configuration information, and the configuration information is used for allocating N search space sets, where N is a positive integer.

The processor 1710 is configured to drop part or all of PDCCH candidates of at least one search space in a first search space set in a case that the number of PDCCH candidates in the first search space set is greater than a maximum number of PDCCH candidates supported by a terminal, so as to obtain a second search space set.

The radio frequency unit 1701 is configured to transmit DCI on the second search space set.

The first search space set is any one of the N search space sets, at least one search space set in the N search space sets includes a first search space, the first search space is a search space for scheduling a second cell by a first cell, the first cell is a secondary cell SCell, and the number of PDCCH candidates in the second search space set is less than or equal to the maximum number of PDCCH candidates supported by the terminal.

It should be understood that in this embodiment, the processor 1710 and the radio frequency unit 1701 is capable of implementing the processes implemented by the terminal in the method embodiment in FIG. 3. To avoid repetition, details are not described herein again.

Figure 18:
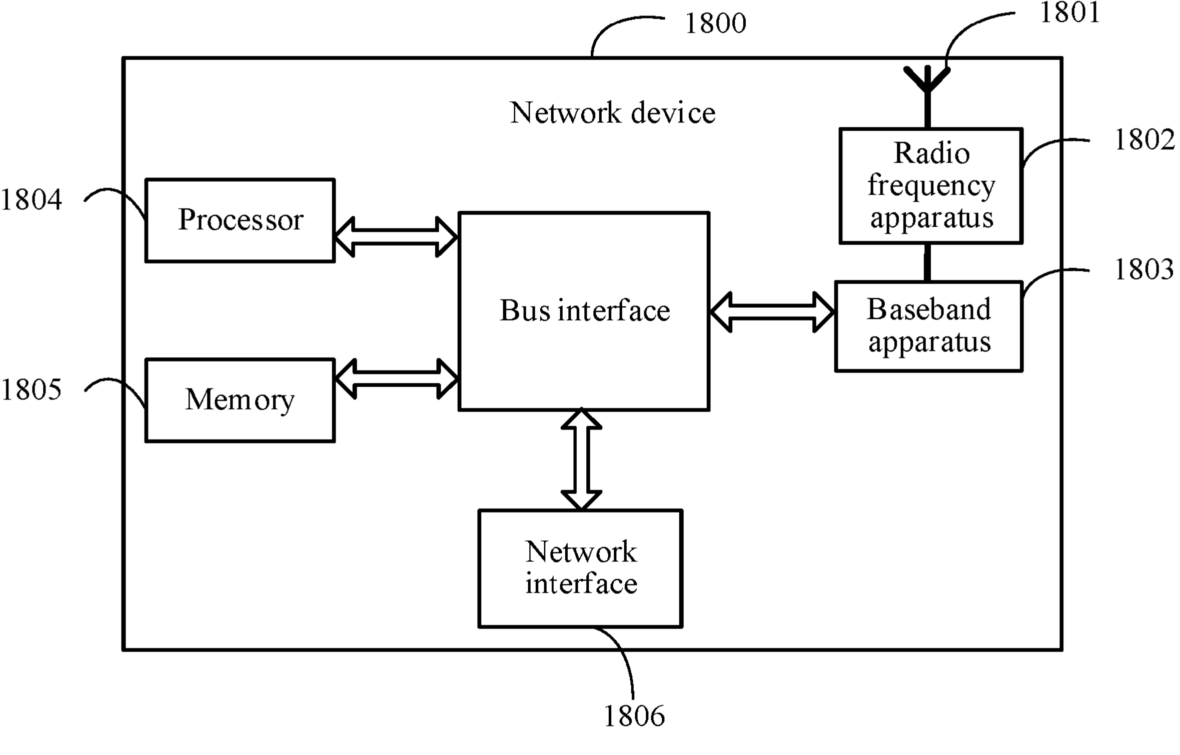
FIG. 18 is a structural diagram of a network device according to an embodiment of this application.

Alternatively, an embodiment of this application further provides a network device. As shown in FIG. 18, the network device 1800 includes an antenna 1801, a radio frequency apparatus 1802, and a baseband apparatus 1803. The antenna 1801 is connected to the radio frequency apparatus 1802. In an uplink direction, the radio frequency apparatus 1802 receives information by using the antenna 1801, and sends the received information to the baseband apparatus 1803 for processing. In a downlink direction, the baseband apparatus 1803 processes to-be-sent information, and sends the information to the radio frequency apparatus 1802; and the radio frequency apparatus 1802 processes the received information and then sends the information out by using the antenna 1801.

The frequency band processing apparatus may be located in the baseband apparatus 1803. The method performed by the network device in the foregoing embodiment may be implemented in the baseband apparatus 1803, and the baseband apparatus 1803 includes a processor 1804 and a memory 1805.

The baseband apparatus 1803 may include, for example, at least one baseband processing unit, where a plurality of chips are disposed on the baseband processing unit. As shown in FIG. 18, one of the chips is, for example, the processor 1804, connected to the memory 1805, to invoke a program in the memory 1805 to perform the operation of the network device shown in the foregoing method embodiment.

The baseband apparatus 1803 may further include a network interface 1806, configured to exchange information with the radio frequency apparatus 1802, where the interface is, for example, a common public radio interface (common public radio interface, CPRI).

Alternatively, the network device in this embodiment of this application further includes: an instruction or a program stored in the memory 1805 and capable of running on the processor 1804. The processor 1804 invokes the instruction or program in the memory 1805 to execute the method executed by the modules shown in FIG. 15, with the same technical effects achieved. To avoid repetition, details are not described herein again.

An embodiment of this application further provides a readable storage medium, where a program or an instruction is stored in the readable storage medium. When the program or the instruction is executed by a processor, the processes of the foregoing embodiment of the DCI transmission method can be implemented, with the same technical effects achieved. To avoid repetition, details are not described herein again.

The processor is a processor in the electronic device described in the foregoing embodiments. The readable storage medium includes a computer-readable storage medium, for example, a computer read-only memory (Read-Only Memory, ROM), a random access memory (Random Access Memory, RAM), a magnetic disk, or an optical disc.

An embodiment of this application further provides a chip, where the chip includes a processor and a communications interface. The communications interface is coupled to the processor, and the processor is configured to run a program or an instruction of a network device to implement the processes of the foregoing transmission method embodiments, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a base station, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A downlink control information (DCI) transmission method, comprising:

transmitting configuration information, wherein the configuration information is used for allocating N search space sets, and N is a positive integer;

dropping part or all of physical downlink control channel (PDCCH) candidates of at least one search space in a first search space set in a case that the number of PDCCH candidates in the first search space set is greater than a maximum number of PDCCH candidates supported by a terminal, so as to obtain a second search space set; and transmitting DCI on the second search space set;

wherein the first search space set is any one of the N search space sets, at least one search space set in the N search space sets comprises a first search space, the first search space is a search space for scheduling a second cell by a first cell, the first cell is a secondary cell (SCell), and the number of PDCCH candidates in the second search space set is less than or equal to the maximum number of PDCCH candidates supported by the terminal;

wherein the maximum number of PDCCH candidates supported by the terminal comprises at least one of the following:

a maximum number X of PDCCH candidates corresponding to self-scheduling of a primary cell (PCell);

a maximum number Y of cross-carrier PDCCH candidates corresponding to scheduling of the PCell by the first cell; or a maximum number P of PDCCH candidates supported by the PCell;

wherein the number of PDCCH candidates of the second search space set being less than or equal to the maximum number of PDCCH candidates supported by the terminal comprises at least one of the following:

the number of PDCCH candidates of a second search space in each second time unit is less than or equal to X, and the second search space is a search space for self-scheduling of the PCell; or in a case that the number of PDCCH candidates of a third search space belongs to the number of PDCCH candidates of the PCell, the number of PDCCH candidates of the third search space in each second time unit is less than or equal to a first value;

wherein the second time unit is a time unit for an SCS of the PCell, and the third search space is a search space for scheduling the PCell by the SCell.

2. The method according to claim 1, wherein the configuration information is further used for allocating a corresponding quantity of PDCCH candidates for each of the search space sets.

3. The method according to claim 2, wherein Y comprises any one of the following:

a maximum number of PDCCH candidates using a first time unit in the first cell; and a maximum number of PDCCH candidates using a second time unit in the first cell;

wherein the first time unit is a time unit for a subcarrier spacing (SCS) of the first cell, and the second time unit is a time unit for an SCS of the Pcell, or, wherein P satisfies:

in a case that the number of PDCCH candidates of the third search space belongs to the number of PDCCH candidates of the PCell and Y is the maximum number of PDCCH candidates using the second time unit in the first cell, P=X+Y;

wherein the third search space is a search space for scheduling the PCell by the SCell.

4. The method according to claim 2, wherein the first value satisfies:

in a case that Y is the maximum number of PDCCH candidates using the first time unit in the PCell, the first value is Y.

5. The method according to claim 2, wherein in a case that the PCell supports overbooking of the number of PDCCH candidates, the second search space set corresponding to the PCell satisfies:

in a case that Y is the maximum number of PDCCH candidates using a second time unit in the PCell, a sum of the number of PDCCH candidates in the third search space and the number of PDCCH candidates in the second search space is less than or equal to X+Y;

wherein the second time unit is a time unit for an SCS of the PCell, the second search space is a search space for self-scheduling of the PCell, and the third search space is a search space for scheduling the PCell by the SCell.

6. The method according to claim 2, wherein in a case that the first cell supports overbooking of the number of PDCCH candidates, the second search space set corresponding to the first cell satisfies:

the number of PDCCH candidates in a second search space is less than or equal to P;

wherein the second search space is a search space for self-scheduling of the PCell, the third search space is a search space for scheduling the PCell by the SCell, and wherein the second time unit is a time unit for an SCS of the PCell.

7. The method according to claim 1, wherein the dropping part or all of physical downlink control channel PDCCH candidates of at least one search space in a first search space set in a case that the number of PDCCH candidates in the first search space set is greater than a maximum number of PDCCH candidates supported by a terminal comprises:

dropping part or all of the PDCCH candidates of the at least one search space in the first search space set in a case that a total number of target PDCCH candidates is greater than a maximum total number of PDCCH candidates of a target cell that are supported by the terminal; wherein the total number of target PDCCH candidates is a sum of the number of PDCCH candidates of all search spaces in M search spaces in a target time unit, the M search spaces are search spaces in the first search space set corresponding to the target cell, and the target time unit is a time unit for overbooking in the target cell, wherein a time length of the target time unit is determined based on an SCS of the target cell.

8. The method according to claim 7, wherein in a case that the target cell is the PCell, priorities of search spaces in the first search space set corresponding to the PCell satisfies any one of the following:

a priority of a user-specific search space (USS) for self-scheduling of the PCell is higher than a priority of a third search space, and is lower than a priority of a common search space (CSS) for self-scheduling of the PCell; and a priority of the third search space is higher than a priority of the USS for self-scheduling of the PCell, and is lower than the priority of the CSS for self-scheduling of the PCell; wherein the third search space is a search space for scheduling the PCell by the SCell.

9. The method according to claim 7, wherein in a case that the target cell is the PCell, priorities of search spaces in the first search space set corresponding to the PCell satisfies: a priority of a CSS for self-scheduling of the PCell is greater than that of a USS in the first cell.

10. The method according to claim 7, wherein a dropping rule for dropping part or all of the PDCCH candidates of the at least one search space comprises:

dropping part or all of the PDCCH candidates in the search space in descending order or ascending order of indexes of the search spaces.

11. The method according to claim 10, wherein the dropping rule further comprises:

dropping the PDCCH candidates in ascending order of priorities by using PDCCH candidates in the search spaces as units.

12. A communications device, comprising:

a processor; and a memory storing a program that is capable of running on the processor, wherein the program, when executed by the processor, causes the communication device to:

transmit configuration information, wherein the configuration information is used for allocating N search space sets, and N is a positive integer;

drop part or all of physical downlink control channel (PDCCH) candidates of at least one search space in a first search space set in a case that the number of PDCCH candidates in the first search space set is greater than a maximum number of PDCCH candidates supported by a terminal, so as to obtain a second search space set; and transmit downlink control information (DCI) on the second search space set;

wherein the first search space set is any one of the N search space sets, at least one search space set in the N search space sets comprises a first search space, the first search space is a search space for scheduling a second cell by a first cell, the first cell is a secondary cell (SCell), and the number of PDCCH candidates in the second search space set is less than or equal to the maximum number of PDCCH candidates supported by the terminal;

wherein the maximum number of PDCCH candidates supported by the terminal comprises at least one of the following:

a maximum number X of PDCCH candidates corresponding to self-scheduling of a primary cell (PCell);

a maximum number Y of cross-carrier PDCCH candidates corresponding to scheduling of the PCell by the first cell; or a maximum number P of PDCCH candidates supported by the PCell;

wherein the number of PDCCH candidates of the second search space set being less than or equal to the maximum number of PDCCH candidates supported by the terminal comprises at least one of the following:

the number of PDCCH candidates of a second search space in each second time unit is less than or equal to X, and the second search space is a search space for self-scheduling of the PCell; or in a case that the number of PDCCH candidates of a third search space belongs to the number of PDCCH candidates of the PCell, the number of PDCCH candidates of the third search space in each second time unit is less than or equal to a first value;

wherein the second time unit is a time unit for an SCS of the PCell, and the third search space is a search space for scheduling the PCell by the SCell.

13. The communications device according to claim 12, wherein the configuration information is further used for allocating a corresponding quantity of PDCCH candidates for each of the search space sets.

14. The communications device according to claim 13, wherein Y comprises any one of the following:

a maximum number of PDCCH candidates using a first time unit in the first cell; and a maximum number of PDCCH candidates using a second time unit in the first cell;

wherein the first time unit is a time unit for a subcarrier spacing (SCS) of the first cell, and the second time unit is a time unit for an SCS of the Pcell; or, wherein P satisfies:

in a case that the number of PDCCH candidates of the third search space belongs to the number of PDCCH candidates of the PCell and Y is the maximum number of PDCCH candidates using the second time unit in the first cell, P=X+Y;

wherein the third search space is a search space for scheduling the PCell by the SCell.

15. The communications device according to claim 14, wherein the first value satisfies:

in a case that Y is the maximum number of PDCCH candidates using the first time unit in the PCell, the first value is Y.

16. The communications device according to claim 13, wherein in a case that the PCell supports overbooking of the number of PDCCH candidates, the second search space set corresponding to the PCell satisfies:

in a case that Y is the maximum number of PDCCH candidates using a second time unit in the PCell, a sum of the number of PDCCH candidates in the third search space and the number of PDCCH candidates in the second search space is less than or equal to X+Y;

wherein the second time unit is a time unit for an SCS of the PCell, the second search space is a search space for self-scheduling of the PCell, and the third search space is a search space for scheduling the PCell by the SCell.

17. The communications device according to claim 13, wherein in a case that the first cell supports overbooking of the number of PDCCH candidates, the second search space set corresponding to the first cell satisfies:

the number of PDCCH candidates in a second search space is less than or equal to P;

wherein the second search space is a search space for self-scheduling of the PCell, the third search space is a search space for scheduling the PCell by the SCell, and the second time unit is a time unit for an SCS of the PCell.

* * * * *